US011312843B2

(12) United States Patent
Siolek-Komorek et al.

(10) Patent No.: US 11,312,843 B2
(45) Date of Patent: Apr. 26, 2022

(54) BISSILYLAMINOSILYL-FUNCTIONALIZED CONJUGATED DIENES AND THEIR USE IN THE PRODUCTION OF RUBBERS

(71) Applicants: SYNTHOS DWORY 7 SPOLKA Z OGRANICZONA ODPOWIEDZIALNOSCIA SPOLKA JAWNA, Oswiecim (PL); SYNTHOS S.A., Oswiecim (PL)

(72) Inventors: Maria Siolek-Komorek, Katowice (PL); Radoslaw Kozak, Chorzów (PL); Pawel Weda, Knurow (PL); Robert Bogacz, Bulowice (PL); Tomasz Skrok, Warsaw (PL); Dawid Bartus, Nowa Wies (PL); Malgorzata Walenia, Szczecin (PL)

(73) Assignees: SYNTHOS DWORY 7 SPOLKA Z OGRANICZONA ODPOWIEDZIALNOSCIA SPOLKA JAWNA, Oswiecim; SYNTHOS S.A, Oswiecim (PL)

( * ) Notice: Subject to any disclaimer, the term of this patent is extended or adjusted under 35 U.S.C. 154(b) by 301 days.

(21) Appl. No.: 16/478,198

(22) PCT Filed: Jul. 31, 2018

(86) PCT No.: PCT/EP2018/070796
§ 371 (c)(1),
(2) Date: Jul. 16, 2019

(87) PCT Pub. No.: WO2019/030064
PCT Pub. Date: Feb. 14, 2019

(65) Prior Publication Data
US 2019/0367708 A1 Dec. 5, 2019

(30) Foreign Application Priority Data

Aug. 8, 2017 (EP) .................................... 17461581
Nov. 14, 2017 (EP) .................................... 17201732

(51) Int. Cl.
C08L 9/06 (2006.01)
B60C 1/00 (2006.01)
C08C 19/22 (2006.01)
C08C 19/25 (2006.01)
C08K 3/04 (2006.01)
C08K 3/06 (2006.01)
C08K 3/08 (2006.01)
C08K 3/16 (2006.01)
C08K 3/30 (2006.01)
C08K 3/36 (2006.01)
C08K 5/09 (2006.01)
C08K 5/31 (2006.01)
C08L 91/06 (2006.01)

(52) U.S. Cl.
CPC .............. *C08L 9/06* (2013.01); *B60C 1/0016* (2013.01); *C08C 19/22* (2013.01); *C08C 19/25* (2013.01); *C08K 3/04* (2013.01); *C08K 3/06* (2013.01); *C08K 3/08* (2013.01); *C08K 3/16* (2013.01); *C08K 3/30* (2013.01); *C08K 3/36* (2013.01); *C08K 5/09* (2013.01); *C08K 5/31* (2013.01); *C08L 91/06* (2013.01); *C08K 2003/0893* (2013.01); *C08K 2003/3009* (2013.01)

(58) Field of Classification Search
CPC ......... C08L 9/06; B60C 1/0016; C08C 19/22; C08C 19/25; C08K 3/04; C08K 3/36
USPC ........................................................ 523/156
See application file for complete search history.

(56) References Cited

U.S. PATENT DOCUMENTS

2010/0056712 A1* 3/2010 Oshima .................... C08L 15/00
524/572
2016/0264601 A1* 9/2016 Rossie ....................... C08L 9/00

FOREIGN PATENT DOCUMENTS

| EP | 2 857 446 | 4/2015 |
| EP | 3 064 546 | 9/2016 |
| EP | 3 159 346 | 4/2017 |
| RU | 2 372 352 | 11/2009 |
| WO | 2016/162473 | 10/2016 |
| WO | 2016/162528 | 10/2016 |
| WO | WO 2017/067877 | * 4/2017 |
| WO | 2018/065486 | 4/2018 |
| WO | 2018/065494 | 4/2018 |
| WO | 2019/030059 | 2/2019 |

OTHER PUBLICATIONS

Choudhury et al., "Preparation and Reaction Chemistry of Novel Silicon-Substituted 1,3-Dienes" *Molecules*, vol. 20: 16892-16907 (2015) doi:10.3390/molecules200916892.

Friebe et al., "Polymerization of 1,3-Butadiene Initiated by Neodymium Versatate/Diisobutylaluminium Hydride/Ethylaluminium Sesquichloride: Kinetics and Conclusions About the Reaction Mechanism" *Macromol. Chem. Phys.*, vol. 203: 1055-1064 (2002).

Friebe et al., "A Comparison of Neodymium Versatate, Neodymium Neopentanolate and Neodymium Bis(2-ethylhexyl)phosphate in Ternary Ziegler Type Catalyst Systems With Regard to their Impact on the Polymerization of 1,3-Butadiene" *Journal of Macromolecular Science, Part A: Pure and Applied Chemistry*, vol. 42: 839-851 (2005).

(Continued)

*Primary Examiner* — Doris L Lee
(74) *Attorney, Agent, or Firm* — Nixon & Vanderhye P.C.

(57) ABSTRACT

The invention relates to bissilylaminosilyl-functionalized conjugated dienes and their use in the production of rubbers. Further, the invention relates to rubbers and rubber compositions.

54 Claims, No Drawings

(56) References Cited

OTHER PUBLICATIONS

Pullan et al., "Reversible addition-fragmentation chain transfer polymerization of 2-chloro-1,3-butadiene" *Polymer Chemistry*, vol. 4: 2272-2277 (2013).
Schmalz et al., Z. *Anal. Chem.* pp. 181, 229 (1961).
Office Action issued in RU Appln. No. 2019124014/04(046928) dated Jan. 10, 2020 (w/ translation).
International Search Report and Written Opinion of the ISA for PCT/EP2018/070796 dated Oct. 2, 2018, 11 pages.

\* cited by examiner

BISSILYLAMINOSILYL-FUNCTIONALIZED CONJUGATED DIENES AND THEIR USE IN THE PRODUCTION OF RUBBERS

This application is the U.S. national phase of International Application No. PCT/EP2018/070796 filed Jul. 31, 2018 which designated the U.S. and claims priorities to EP 17461581.5 filed Aug. 8, 2017, and EP 17201732.9 filed Nov. 14, 2017, the entire contents of each of which are hereby incorporated by reference.

The present invention relates to bissilylaminosilyl-functionalized conjugated dienes and their use in the production of rubbers. Further, the invention relates to rubbers and rubber compositions.

A variety of conjugated diene monomers is known that can be used in the production of synthetic rubbers. However, there is a need in the art for further conjugated diene monomers that can be used in advantageous polymerization processes, or that confer advantageous properties to the rubbers produced from such conjugated diene monomers.

STATE OF THE ART

P. P. Choudhury and M. E. Welker (Molecules 2015, 20, 16892-16907) report the preparation of 2-silicon-substituted 1,3-dienes via Grignard chemistry. The authors further report the use of the 2-silicon-substituted 1,3-dienes in one pot metathesis/Diels-Alder reactions in regio- and diastereoselective fashions.

EP 3 159 346 A1 teaches aminosilane-functionalized diene compounds that are useful as modifying monomers in the polymerization of conjugated diene monomers, optionally together with aromatic vinyl monomers, thus producing polymers, specifically elastomeric polymers, which can be used in rubber articles such as tires.

WO2016/162473 A1 and WO2016/162528 A1 A1 disclose aminosilyl-functionalized styrenes and methods for their preparation, as well as the use of the styrene derivatives in the preparation of a copolymer thereof.

EP 3 064 546 A1 teaches the use of vinylsilanes in the production of rubbers. EP 2 857 446 A1 teaches a conjugated diene polymer derived from conjugated diene, a monomer unit $V^1$-$S^1$, and a monomer unit $V^2$-$A^2$, where $V^1$ and $V^2$ each represent a hydrocarbyl group containing a polymerizable carbon carbon double bond, $S^1$ represents a substituted silyl group, and $A^2$ is an amino group or a nitrogen-containing heterocycle group.

Accordingly, it was an object of the invention to provide conjugated diene monomers for the production of synthetic rubbers. These conjugated diene monomers should be based on easily accessible starting materials, and should be accessible via simple synthetic routes. Moreover, the conjugated diene monomers should be universally applicable, i.e. in a variety of different polymerization processes, and should confer advantageous properties to the rubbers.

It has now surprisingly been found in accordance with the present invention that this object is solved by the use of conjugated dienes having specific bissilylaminosilyl-functionalization. The functionalized conjugated dienes are selected from the group of compounds of formulae (Ia), (Ib), (Ic)

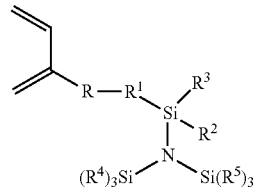

(Ia)

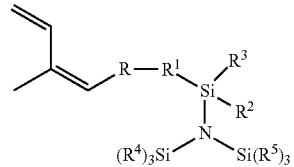

(Ib)

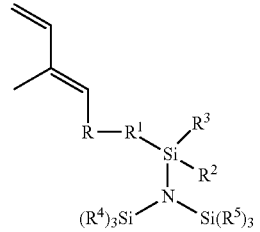

(Ic)

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

The functionalized conjugated dienes of the invention, when used e.g. in the production of solution styrene butadiene rubber (SSBR) and Ziegler-Natta catalyzed (e.g. neodymium) butadiene rubber (Nd-BR), increase the interaction of the polymer with fillers and thus filler dispersion in the polymer matrix, helping to improve the dynamic and mechanical properties of tire tread compounds.

In a first aspect, the present invention relates to functionalized conjugated diene.

In a second aspect, the invention relates to the use of the functionalized conjugated dienes in the production of an elastomeric copolymer.

In a third aspect, the invention relates to a process for the production of copolymer component comprising coupled copolymer and terminally modified copolymer.

In a fourth aspect, the invention relates to a process for producing an elastomeric copolymer comprising anionic polymerization conditions.

In a fifth aspect, the invention relates to a process for producing an elastomeric copolymer comprising Ziegler-Natta polymerization conditions.

In a sixth aspect, the invention relates to an elastomeric copolymer.

In a seventh aspect, the invention relates to a method for producing a rubber.

In an eighth aspect, the invention relates to a rubber.

In a ninth aspect, the invention relates to a rubber composition.

In a tenth aspect, the invention relates to a tire component.

Finally, in an eleventh aspect, the invention relates to a tire.

DETAILED DESCRIPTION OF THE INVENTION

The functionalized conjugated diene according to the first aspect of the invention is selected from the group of compounds of formula (Ia), (Ib), (Ic)

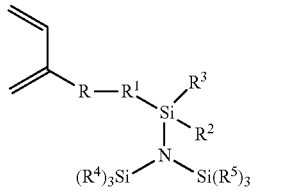
(Ia)

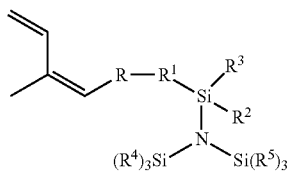
(Ib)

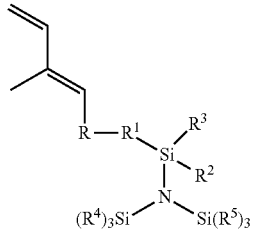
(Ic)

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

Preferably, $R^1$ of the functionalized conjugated diene of the present invention is selected from (i) a single bond, and (iii)

a) $-(CH_2)_m-$, wherein m represents an integer from 1 to 12; or
b) $-((CH_2)_mY(CH_2)_n)_o-$, wherein m and n independently represent an integer from 0 to 12, o is an integer from 1 to 12, and Y is independently one or more of an oxygen atom, a sulfur atom, a group $NR^6$, and a group $SiR^7R^8$.

Most preferably, $R^1$ is (i) a single bond, or is (iii)b) $-(SiR^7R^8CH_2CH_2)-$.

It is further preferred that $R^2$, $R^3$, $R^6$, $R^7$, and $R^8$ of the functionalized conjugated diene of the present invention are the same or different and represent $CH_3$ or $C_6H_5$. Most preferably $R^2$, $R^3$, $R^6$, $R^7$, and $R^8$ all represent $CH_3$. Also, it is preferred that $R^4$ and $R^5$ all represent $CH_3$.

Preferably, the conjugated diene selected from the group of compounds of formula (IIa), (IIb), (IIc)

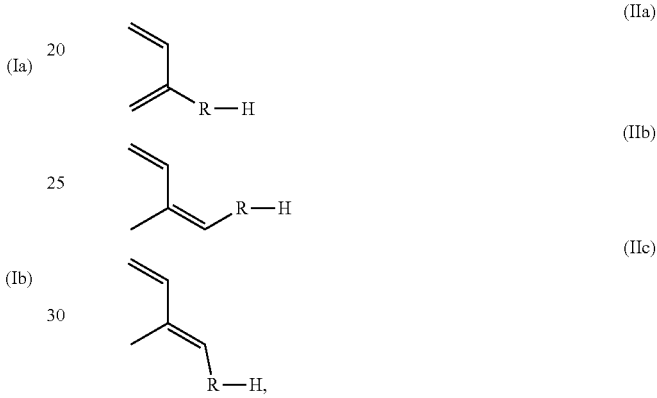

from which the functionalized conjugated diene of formula (Ia), (Ib), (Ic) is derived, has at least 10 carbon atoms. More preferably, the conjugated diene of formula (IIa), (IIb), (IIc) is selected from terpenes and 4,8-dimethyl-1,3,7-nonatriene. More preferably the terpene is selected from myrcene and ocimene, most preferably the terpene is myrcene selected from α-myrcene and β-myrcene.

Further details regarding the synthesis of preferred functionalized conjugated dienes of formula (Ia), (Ib), (Ic) are given in the international application entitled "Bissilylaminosilyl-functionalized conjugated dienes and methods for their preparation" filed on even date herewith (PCT/EP2018/070768, claiming priority from EP17201702.2 and EP17461580.7), which international application PCT/EP2018/070768 and priority applications EP17201702.2 and EP17461580.7 are incorporated herein in their entirety. International application PCT/EP2018/070768 and priority applications EP17201702.2 and EP17461580.7 disclose a method for the preparation of a conjugated diene chloride comprising chlorinating a starting conjugated diene selected from the group of compounds of formula (IIa), (IIb), (IIc)

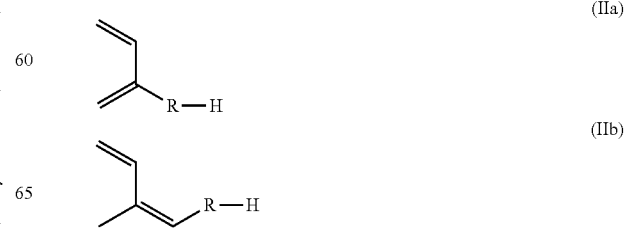

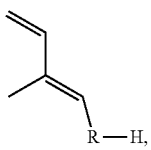

wherein R is a linear or branched, saturated or unsaturated hydrocarbylene group, and the starting conjugated diene of formula (IIa), (IIb), (IIc) has at least 10 carbon atoms, with a chlorinating agent comprising trichloroisocyanuric acid, dichloroisocyanuric acid, an alkali metal salt of dichloroisocyanuric acid, or a mixture thereof.

Furthermore, and in a second aspect, international application PCT/EP2018/070768 and priority applications EP17201702.2 and EP17461580.7 disclose a method for the preparation of a functionalized conjugated diene selected from the group of compounds of formula (Ia), (Ib), (IIIc)

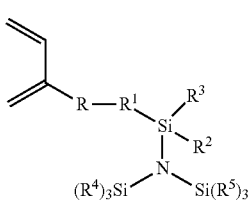

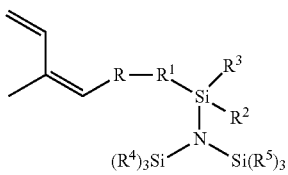

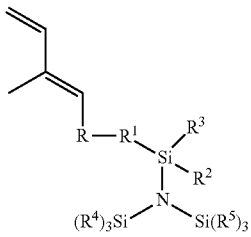

wherein
R is a linear or branched, saturated or unsaturated hydrocarbylene group, and the starting conjugated diene selected from the group of compounds of formula (IIa), (IIb), (IIc)

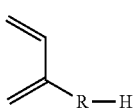

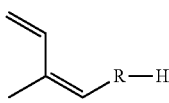

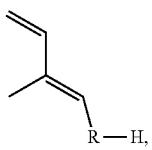

from which the functionalized conjugated diene of formula (Ia), (Ib), (Ic) is derived, has at least 10 carbon atoms, $R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$, $R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms, the method comprising reacting, under Grignard conditions, a conjugated diene chloride selected from the group of compounds of formula (Xa), (Xb), (Xc)

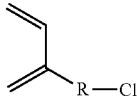

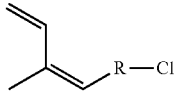

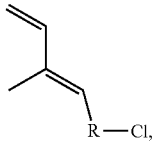

with a compound of formula (XI)

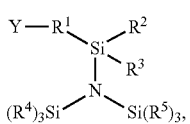

wherein Y is selected from chlorine, bromine, and iodine atoms.

Also, in a third aspect, international application PCT/EP2018/070768 and priority applications EP17201702.2 and EP17461580.7 relate to a method for the preparation of a functionalized conjugated diene selected from the group of compounds of formula (Ia), (Ib), (Ic)

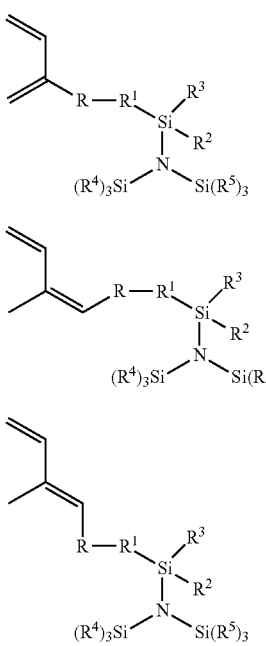

(Ia)

(Ib)

(Ic)

wherein

R is a linear or branched, saturated or unsaturated hydrocarbylene group, and the starting conjugated diene selected from the group of compounds of formula (IIa), (IIb), (IIc)

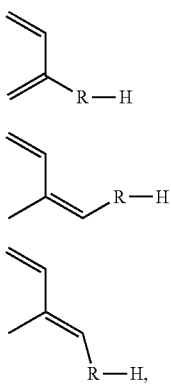

(IIa)

(IIb)

(IIc)

from which the functionalized conjugated diene of formula (Ia), (Ib), (Ic) is derived, has at least 10 carbon atoms, $R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$, $R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms, the method comprising A) reacting, under Grignard conditions, a conjugated diene chloride selected from the group of compounds of formula (Xa), (Xb), (Xc)

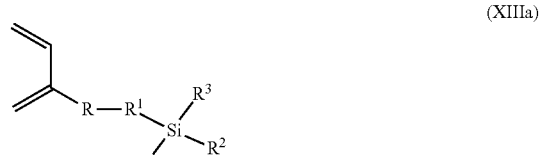

(Xa)

(Xb)

(Xc)

with a compound of formula (XII)

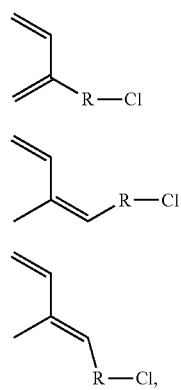

(XII)

wherein $Y^1$ and $Y^2$ are independently selected from chlorine, bromine, and iodine atoms, and preferably $Y^1$ and $Y^2$ are each chlorine atoms, to result in a compound of formula (XIIIa), (XIIIb), (XIIIc)

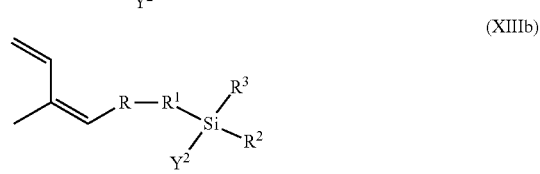

(XIIIa)

(XIIIb)

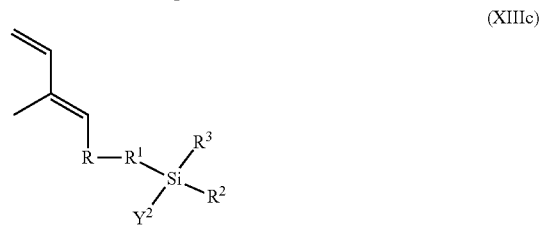

(XIIIc)

and

B) reacting the compound of formula (XIIIa), (XIIIb), (XIIIc) with a bissilylamide of formula (XIV)

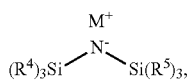
(XIV)

wherein M is an alkali metal selected from lithium, sodium and potassium, and M is preferably sodium.

In a first embodiment of the first aspect, the functionalized conjugated diene of the present invention is preferably a butadiene derivative of formula (XV)

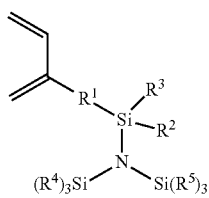
(XV)

wherein $R^1$ to $R^5$ are as defined above in respect of formula (Ia). Preferred compounds of this type are

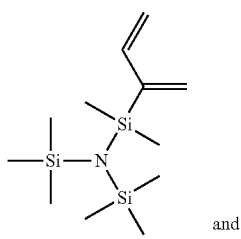
(XVa)

and

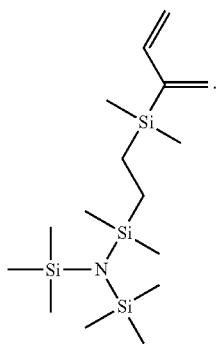
(XVb)

Compounds of formula (XV) may, in a first alternative method, be prepared by reacting, under Grignard conditions, a 2-halide derivative of butadiene. Such reaction is preferably performed by reacting, under Grignard conditions (which Grignard conditions preferably comprise the presence of magnesium metal and an ether, such as THF), a compound of formula (XVII)

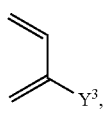
(XVII)

wherein $Y^3$ is selected from chlorine, bromine, and iodine atoms, and $Y^3$ is preferably a chlorine atom, with a compound of formula (XVIII)

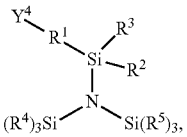
(XVIII)

wherein $Y^4$ is selected from chlorine, bromine, and iodine atoms, and $Y^4$ is preferably a chlorine atom.

Compounds of formula (XV) may, in a second alternative method, be prepared by a method comprising A) reacting, under Grignard conditions, a compound of formula (XVII)

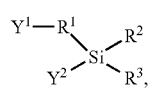
(XVII)

wherein $Y^3$ is selected from chlorine, bromine, and iodine atoms, and $Y^3$ is preferably a chlorine atom, with a compound of formula (XII)

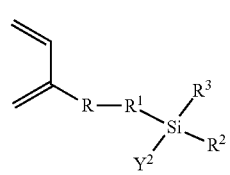
(XII)

wherein $Y^1$ and $Y^2$ are independently selected from chlorine, bromine, and iodine atoms, and preferably $Y^1$ and $Y^2$ are each chlorine atoms, to result in a compound of formula (XIX)

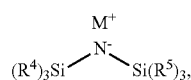
(XIX)

and

B) reacting the compound of formula (XIX) with a bissilylamide of formula (XIV)

(XIV)

$(R^4)_3Si\overset{M^+}{\underset{}{N^-}}Si(R^5)_3,$ wherein M is an alkali metal selected from lithium, sodium and potassium, and M is preferably sodium.

In a second embodiment of the first aspect, the functionalized conjugated diene of the invention is preferably a myrcene derivative of formula (III), (IV), or (V)

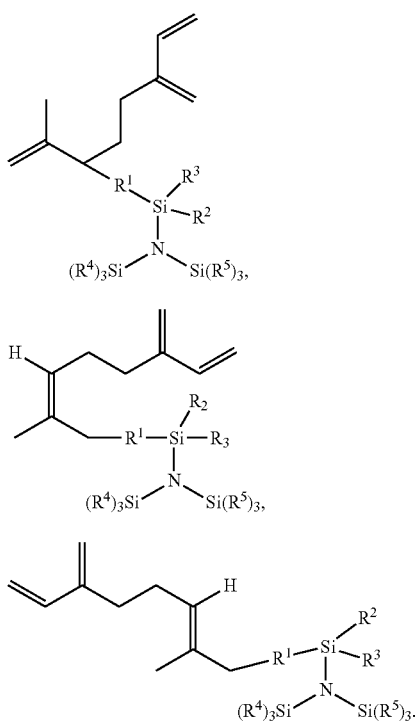

More preferably, the myrcene derivative is of formula (IIIa), (IVa), or (Va)

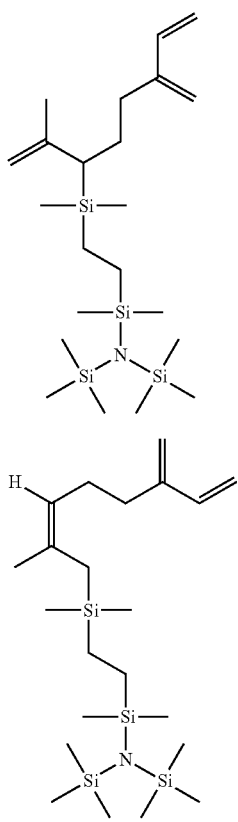

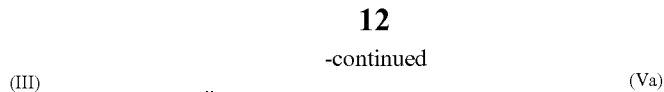

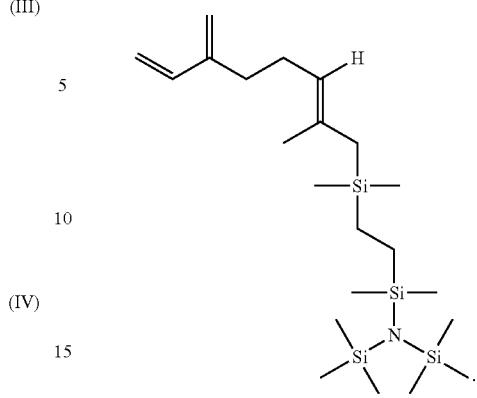

In a second aspect, the present invention relates to the use of one or more functionalized conjugated dienes of the first aspect in the production of an elastomeric copolymer. The elastomeric copolymer preferably comprises, in addition to one or more units derived from the one or more functionalized conjugated dienes selected from the group of compounds of formula (Ia), (Ib), (Ic), units derived from one or more conjugated diene monomers.

The conjugated diene monomer as used in the production of the elastomeric copolymer according to the second aspect of the invention is preferably selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. More preferably, the conjugated diene monomer is selected from 1,3-butadiene and isoprene, in particular, the conjugated diene monomer is 1,3-butadiene.

Preferably, the use according to the second aspect is in the production of an elastomeric copolymer by 1) anionic polymerization or by 2) coordination polymerization.

It is preferred that the elastomeric copolymer further comprises units derived from one or more vinyl aromatic monomers. The vinyl aromatic monomer is preferably styrene.

According to the invention, the amount of units derived from the one or more functionalized conjugated dienes selected from of the group of compounds of formula (Ia), (Ib), (Ic) is preferably in a range of from 0.05 to 5 wt. %, based on the weight of the elastomeric copolymer, more preferably in a range of from 0.2 to 1.5 wt. %, most preferably in a range of from 0.4 to 1.2 wt. %, e.g. in a range of from 0.6 to 1.0 wt. %, such as about 0.8 wt. %.

The use according to the second aspect may be of an alkali metal salt derivative of the functionalized conjugated diene selected from the group of compounds of formula (Ia), (Ib), (Ic)

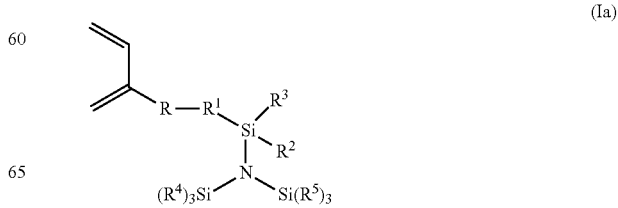

-continued

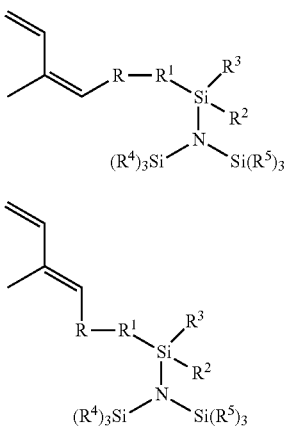

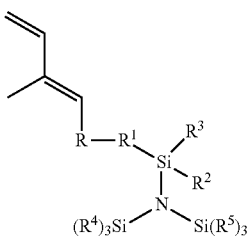

wherein
R is a linear or branched, saturated or unsaturated hydrocarbylene group, and R is optional,
$R^1$ is selected from
i) a single bond,
ii) one or more of an oxygen atom, a sulfur atom, a group $NR^6$, and a group $SiR^7R^8$; and
iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms, as initiator for the anionic copolymerization of one or more conjugated diene monomers, optionally one or more vinyl aromatic monomers, and optionally one or more functionalized conjugated dienes selected from the group of compounds of formula (Ia), (Ib), (Ic).

In a third aspect, the invention relates to a process for the production of a copolymer component comprising coupled copolymer and terminally modified copolymer, the process comprising the following steps:

(1) providing an initiator component, wherein the initiator component preferably comprises one or more alkali metal salt derivatives of a one or more functionalized conjugated dienes selected from the group of compounds of formula (Ia), (Ib), (Ic)

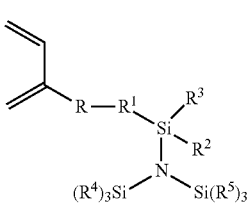

-continued

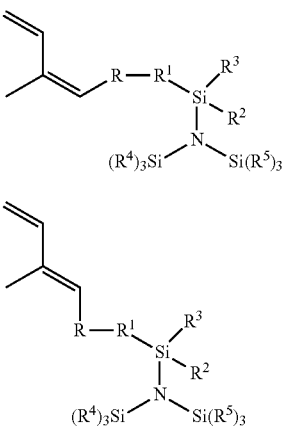

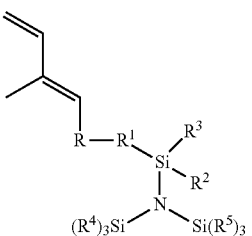

wherein
R is a linear or branched, saturated or unsaturated hydrocarbylene group, and R is optional,
$R^1$ is selected from
i) a single bond,
ii) one or more of an oxygen atom, a sulfur atom, a group $NR^6$, and a group $SiR^7R^8$; and
iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms,
wherein the alkali metal is selected from lithium, sodium, and potassium;

(2) contacting a monomer component comprising
   i) one or more functionalized conjugated dienes selected from the group of compounds of formula (Ia), (Ib), (Ic),
   ii) one or more conjugated diene monomers and
   iii) optionally one or more vinyl aromatic monomers,
   with the initiator component, to initiate anionic copolymerization;
(3) continuing copolymerization, to result in a copolymer;
(4) optionally continuing copolymerization of the copolymer, in the presence of one or more functionalized monomers, to result in a functionalized copolymer;
(5) coupling a part of the copolymer of step (3) or the functionalized copolymer of step (4) with one or more coupling agents, to result in coupled copolymer; and
(6) terminally modifying a part of the copolymer of step (3) or the functionalized copolymer of step (4) with one or more terminal modifying agents, to result in terminally modified copolymer.

In a fourth aspect, the invention relates to a process for producing an elastomeric copolymer comprising subjecting
i) one or more functionalized conjugated dienes selected from the group of compounds of formula (Ia), (Ib), (Ic)

i) one or more functionalized conjugated dienes selected from the group of compounds of formula (Ia), (Ib), (Ic)

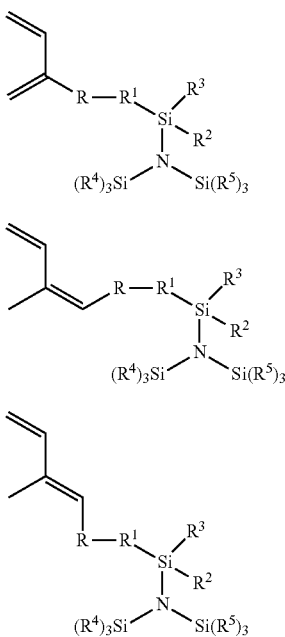

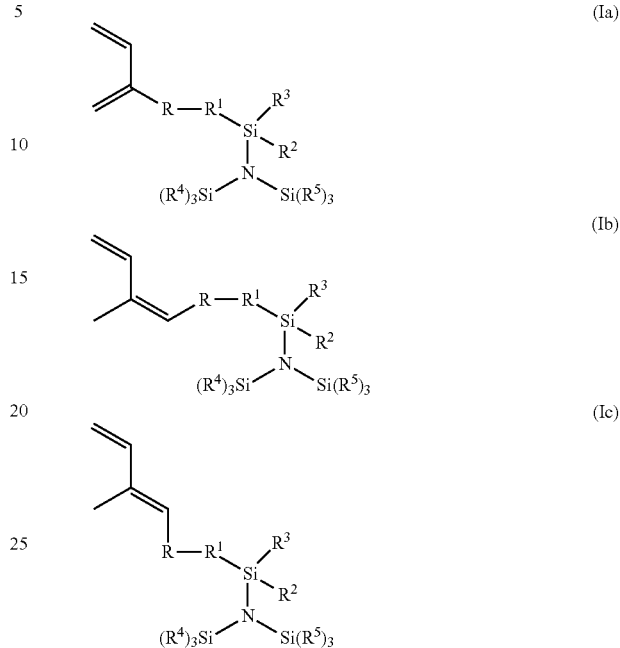

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms,
ii) one or more conjugated diene monomers, and
iii) optionally one or more vinyl aromatic monomers
to anionic polymerization conditions. Preferably, the anionic polymerization conditions include initiating the polymerization with an alkali metal salt derivative of the one or more functionalized conjugated dienes of formula (Ia), (Ib), (Ic), wherein the alkali metal is selected from lithium, sodium, and potassium.

Using anionic polymerization, copolymers having a linear structure or a star structure may be obtained. Also, branching may be performed with e.g. divinylbenzene. The branching level is difficult to predict since it is difficult to fractionate the specific polymer fractions. Thus, it is more appropriate to define the copolymers as obtained by anionic polymerization by their dispersity index, $M_w/M_n$, which is typically as follows:
  Linear copolymer: 1.01 to 2.0;
  Coupled copolymer: 1.1 to 3; and
  Branched copolymer: 1.1 to 8.0.

According to the fifth aspect, the invention relates to a process for producing an elastomeric copolymer comprising subjecting i) one or more functionalized conjugated dienes selected from the group of compounds of formula (Ia), (Ib), (Ic)

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms,
and
ii) one or more conjugated diene monomers
to Ziegler-Natta polymerization conditions.

In the coordination polymerization of conjugated diene (such as 1,3-butadiene), a Ziegler-Natta catalyst is used. Typical catalyst compositions are binary, ternary, or quaternary systems. Binary systems comprise catalytic metal chloride (e.g. chloride of Ni, Co, Ti, Nd, V, Ti, Zr, or Fe) and co-catalyst (e.g. aluminum alkyl or a magnesium alkyl compound). In ternary catalyst systems, a halide-free metal precursor (such as neodymium phosphate) is combined with a co-catalyst (such as aluminium or magnesium alkyl) and a halide donor. Adding halide donors to halide-free catalyst systems significantly increases catalyst activities and cis-1,4 or trans-1,4 contents. In quaternary catalyst systems, a solubilizing agent for either the metal-salt or for the halide donor is used, in addition to the components as used in ternary systems.

The Ziegler-Natta polymerization conditions consequently preferably include a catalyst system comprising 1) metal chloride and 2) co-catalyst. More preferably, the metal chloride 1) is selected from chlorides of one or more of Ni, Co, Ti, Nd, V, Ti, Zr, and Fe, and the co-catalyst 2) is selected from one or more of aluminium and magnesium alkyl compounds. Also, the Ziegler-Natta polymerization conditions may include the presence of further monomers.

It is alternatively preferred that the Ziegler-Natta polymerization conditions include a catalyst system comprising 1) non-halide metal compound, 2) co-catalyst, and 3) halide donor compound. The non-halide metal compound 1) is preferably one or more Nd compounds; more preferably the Nd compound is selected from neodymium carboxylates, neodymium alcoholates, neodymium phosphates, neodymium phosphonates, neodymium allyl compounds, neodymium cyclopentadienyl complexes, neodymium amides, and neodymium acetylacetonates.

The most effective catalysts for the production of high cis polybutadiene are ternary systems based on neodymium, where catalyst precursors such as 1) neodymium carboxylates (e.g. neodymium(III) versatate (NdV), neodymium(III) octanoate (NdO), neodymium(III) isooctanoate (NdiO), neodymium(III) naphthenate (NdN); 2) neodymium alcoholates (e.g. $Nd(OBu)_3$, $Nd(OiPr)_3$); 3) neodymium phosphates and phosphonates (e.g. neodymium bis(2-ethylhexyl) phosphate (NdP), bis(2-ethylhexanol)phosphonate); 4) neodymium allyl compounds; 5) neodymium cyclopentadienyl complexes (e.g. monocyclopentadienyl neodymium dichloride ($CpNdCl_2$), monocyclopentadienyl dialkyl neodymium ($CpNdR_2$), monocyclopentadienyl diallyl neodymium ($CpNd(\eta_3\text{-}C_3H_5)_2$), salts of monoclopentadienyl tris allyl neodymium (e.g $Li[CpNd(\eta_3\text{-}C_3H_5)_3]$), dicyclopentadienyl neodymium monochloride ($Cp_2NdCl$), dicyclopentadienyl monoalkyl neodymium ($Cp_2NdR$), silylene-bridged dicyclopentadienyl neodymium derivatives (e.g. $[R_2Si(Cp)_2]Nd(Cl/R)$); 6) neodymium amides (e.g. $Nd(N(SiMe_3)_2)_3$); or 7) neodymium acetylacetonates are used, in combination with one or more co-catalyst such as: $AlMe_3$ (TMA), $AlEt_3$ (TEA), $AliBu_3$ (TIBA), $AlOct_3$, methyl alumoxane (MAO), tetraisobutyl dialumoxane (TIBAO), $B(C_6F_5)_3$, modified methyl alumoxane (MAO), hexaisobutylalumoxane (HIBAO), diisobutylaluminum hydride (DIBAH), $MgR_2$, $AlPr_3$, $AlBu_3$, $AlHex_3$, $AlOct_3$, $AlDodec_3$, $AlEt_3$, or $AlMe_3$.

Examples for halide donors are $SiCl_4$, ethylaluminium sesquichloride (EASC), diethylaluminium chloride (DEAC), dimethylaluminium chloride, butyl chloride (BuCl), dibutylaluminum chloride, $AlBr_3$, $EtAlCl_2$, and $Me_3SiCl$.

The copolymer as produced in accordance with the fifth aspect, i.e. by coordination polymerization, preferably has linear structure or branched structure. The polymer structure is dictated by catalyst composition and is typically as follows ($M_w/M_n$):

Linear copolymer: 1.5 to 5.0,

Branched copolymer: 1.5 to 20.0.

According to a fifth aspect, the invention relates to an elastomeric copolymer comprising repeat units that are derived from A) 0.05 wt. % to 5 wt. %, by weight of the copolymer, of one or more functionalized conjugated dienes selected from the group of compounds of formula (Ia), (Ib), (Ic)

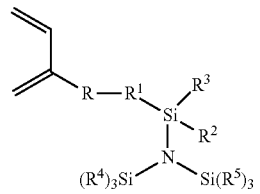

(Ia)

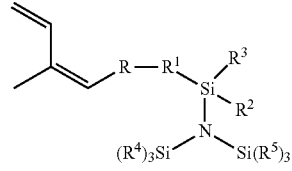

(Ib)

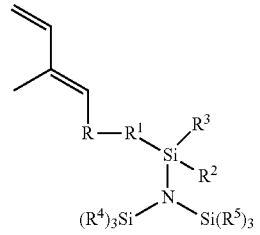

(Ic)

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms;

B) 45 wt. % to 99.95 wt. %, by weight of the copolymer, of one or more conjugated diene monomers;

C) 0 wt. % to 50 wt. %, by weight of the copolymer, of one or more vinyl aromatic monomers.

The amount of B) conjugated diene monomer in the elastomeric copolymer of the sixth aspect is preferably 50 to 92 wt. %, by weight of the copolymer, more preferably 60 to 90 wt. %, by weight of the copolymer, in particular 65 to 80 wt. %, by weight of the copolymer.

The vinyl aromatic monomer, when present, is preferably selected from styrene, 1-vinylnaphthalene, 3-methylstyrene, 3,5-diethylstyrene, 4-propylstyrene, 2,4,6-trimethylstyrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, and α-methylstyrene. More preferably, the vinyl aromatic monomer is selected from styrene, 3-methylstyrene and α-methylstyrene. In particular, the vinyl aromatic monomer is styrene.

The amount of C) vinyl aromatic monomer in the elastomeric copolymer according to the sixth aspect of the present invention is preferably 8 to 45 wt. %, by weight of the copolymer, more preferably 10 to 40 wt. %, by weight of the copolymer, in particular 20 to 35 wt. %, by weight of the copolymer.

Alternatively, the elastomeric copolymer comprises less than 1 wt % C) vinyl aromatic monomer (and preferably no C) vinyl aromatic monomer), and the amount of B) conjugated diene monomer is 95 to 99.95 wt. %, by weight of the copolymer, preferably 98 to 99.6 wt. %, by weight of the copolymer, in particular 99.0 to 99.4 wt. %, by weight of the copolymer.

The conjugated diene monomer in the elastomeric copolymer according to the sixth aspect is preferably selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. More preferably, the conjugated diene monomer is selected from 1,3-butadiene and isoprene. The conjugated diene monomer is in particular 1,3-butadiene.

The copolymer according to the invention may comprise units having a branched structure.

Also, the elastomeric copolymer may comprise units having a linear structure.

Moreover, the elastomeric copolymer may comprise units having a star structure and being produced by the reaction of metal-terminated living linear copolymer with one or more coupling agents in anionic polymerization conditions. The coupling agent may be I) a tin halide coupling agent (preferably the tin halide coupling agent is tin tetrachloride), or
II) a silicon halide coupling agent (preferably the silicon halide coupling agent is selected from silicon tetrachloride, silicon tetrabromide, silicon tetrafluoride, silicon tetraiodide, hexachlorodisilane, hexabromodisilane, hexafluorodisilane, hexaiododdisilane, octachlorotrisilane, octabromotrisilane, octafluorotrisilane, octaiodotrisilane, hexachlorodisiloxane, 2,2,4,4,6,6-hexachloro-2,4,6-trisilaheptane-1,2,3,4,5,6-hexakis[2-(methyldichlorosilyl)ethyl]benzene, and alkyl silicon halides of general formula (XVI)

$R^6_n$—Si—$X_{4-n}$ (XVI), wherein $R^6$ is a monovalent aliphatic hydrocarbon group having 1 to 20 carbon atoms or a monovalent aromatic hydrocarbon group having 6 to 18 carbon atoms; n is an integer of 0 to 2; and X can be a chlorine, bromine, fluorine or iodine atom).

In the elastomeric copolymer according to the sixth aspect, the fraction of units having star structure is preferably between 15 and 75%, by weight of the copolymer.

According to the seventh aspect, the invention relates to a method for producing a rubber comprising vulcanizing the elastomeric copolymer according to the sixth aspect in the presence of one or more vulcanizing agents.

According to an eighth aspect, the invention relates to a rubber as obtainable according to the method of the seventh aspect.

According to a ninth aspect, the invention relates to a rubber composition comprising x) a rubber component comprising the rubber according to the eighth aspect. Preferably, the rubber composition further comprises y) one or more fillers. The filler is preferably selected from the group consisting of silica and carbon black. Most preferably, the rubber composition comprises y) both silica and carbon black.

In a preferred embodiment of the ninth aspect, the amount of filler component y) in the rubber composition is 10 to 150 parts by mass relative to 100 parts by mass of the rubber component x) (phr). Preferably, the amount of filler component y) is 20 to 140 phr. More preferably, the amount of filler component y) is 30 to 130 phr.

Preferably, the rubber component x) in the rubber composition according to the ninth aspect additionally comprises one or more further rubbery polymers. It is preferred that the further rubbery polymer is selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

The tire component according to the tenth aspect of the invention comprises the rubber composition according to the tenth aspect. Preferably, the tire component is a tire tread.

The tire according to the eleventh aspect of the invention comprises the tire component of the tenth aspect.

The advantages of the present invention become more apparent from the following examples.

EXAMPLES

Unless indicated otherwise, all percentages are given by weight. "Parts per hundred rubber", "phr", and "%" are based on mass unless otherwise specified. The measurement methods and evaluation methods of properties are given below.

Preparation of a Functionalized Butadiene

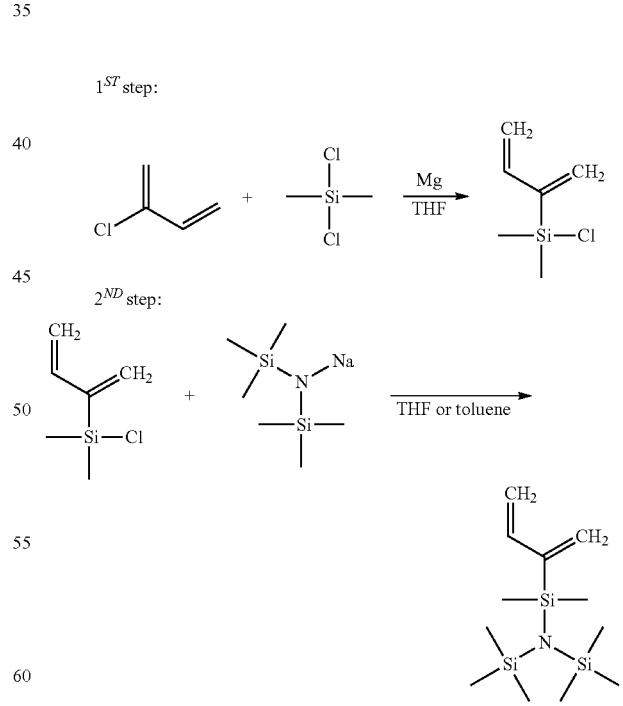

Experimental Procedure

A 500 ml three-necked round-bottom flask was equipped with a magnetic stir bar, an addition funnel, and a reflux condenser under N$_2$. Mg turnings (4 g, 0.16 mol) were added, followed by anhydrous THF (293 ml), then followed by DIBAH (0.5 ml, 2% mol of Mg). The activation of Mg was confirmed by the evolution of gas. Dichlorodimethylsilane (15 g, 0.16 mol) was added to the reaction mixture. After stirring for 5 min, 0.16 mol of chloroprene (which was obtained according to procedure given in literature [1]) was added with constant rate over 10 hours. Upon completion of the addition, the solution was stirred for another 1 h. Next, the reaction mixture was slowly added to a round-bottom flask containing a 20% solution of bis(trimethylsilyl)amine in THF (or toluene). The resultant mixture was stirred for 4 h. After completion of the reaction, solvent was evaporated, and the obtained solid was filtered, yielding a yellow oil.

[1] Nikki Pullan, Max Liu and Paul D. Topham, Polym. Chem., DOI: 10.1039/c3py21151g, 2013.

Mw=357.829 g/mol

GC-MS: 218.41 (95), 188.38 (7), 160.36 (3), 147.40 (17), 130.34 (35), 105.37 (9), 73.37 (46), 59.39 (6), 40.33 (24).

Preparation of Functionalized Myrcene

Example 1: Chlorination of Myrcene

Reaction procedure: 100 g (0.734 mol) of beta-myrcene and 100 ml of acetone were stirred together. Next, a solution of 96.6 g (0.416 mol) of TCCA in 470 ml of acetone was added dropwise, keeping the temperature below 15° C. After 3 h, a sample was subjected to GC-FID analysis which indicated that the product still contained more than 25% of unreacted myrcene. Therefore, stirring of the reaction mixture was continued overnight. After completion of the reaction, the obtained mixture was filtered through celite and activated carbon. Then, the solvent was evaporated off, yielding a milky yellow liquid (155.5 g, more than 100% yield, with the product still containing cyanuric acid). The crude product was distilled under reduced pressure, yielding 50.1 g of yellow liquid (40% yield). GC-FID chromatographic analysis indicated that the product is a mixture of 3 isomers.

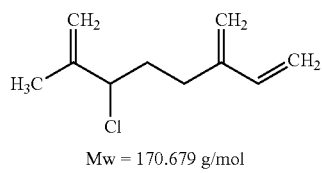

Mw = 170.679 g/mol

GC-MS:

170.40 (17); 135.44 (22.0); 119.41 (60.0); 93.40 (22.0); 91.38 (51); 79.41 (100); 77.39 (27.0); 65.38 (20); 41.41 (31.0);

NMR:

$^1$H NMR (600 MHz, CDCl$_3$, 300 K) δ (ppm)=6.40-6.35 (m, 1H, —CH=), 5.26-5.23 (m, 1H, =CH$_2$), 5.10-5.08 (m, 1H, =CH$_2$), 5.06 (m, 1H, =CH$_2$), 5.04 (m, 2H, =CH$_2$), 4.90 (m, 1H, =CH$_2$), 4.40 (m, 1H, —CH—), 2.40-2.20 (m, 2H, —CH$_2$—), 2.03 (m, 2H, —CH$_2$—), 1.83 (m, 3H, —CH$_3$).

$^{13}$C: NMR (150 MHz, CDCl$_3$, 300 K) δ (ppm)=145.0; 144.4, 138.5; 116.5; 114.3; 113.7; 66.50; 35.20; 28.7; 17.3.

Example 2: In Situ Grignard Reaction of Chloromyrcene

Functionalization of chloromyrcene was performed with 1-[{N,N-bis(trimethylsilylamino)}(dimethylsilyl)]-2-{chlorodimethylsilyl}ethane. The reaction procedure followed the method of functionalization as described in WO2016/162473A; and in WO2018/065486A (PCT/EP2017/075251, claiming priority from EP16461559.3) and WO2018/065494A (PCT/EP2017/075262, claiming priority from EP16461560.1). WO2016/162473A, WO2018/065486A and WO2018/065494A are incorporated herein by reference. Excellent conversion and yield were obtained.

Chloromyrcene as obtained according to Example 1 was positively tested in the Grignard reaction. GC-FID chromatogram showed myrcene and its isomers, two unknown impurities and the functionalized conjugated diene monomer of the invention (three isomers).

Three Main Isomers:

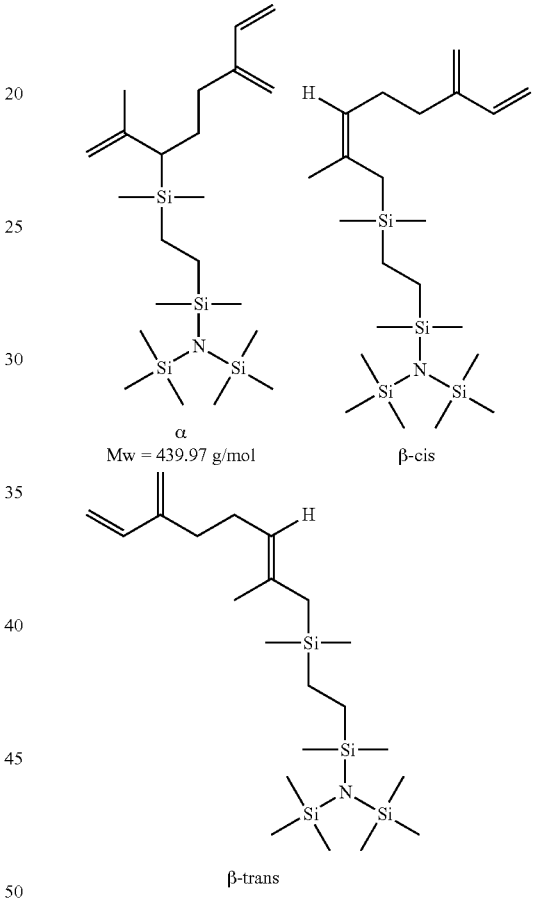

GC-MS:

439.54 (5.0), 304.46 (7.0), 278.49 (10), 218.44 (100), 202.41 (20), 188.41 (8.0), 151.44 (6.0), 130.38 (12), 73.40 (31), 59.37 (16), 45.39 (2).

NMR:

$^1$H NMR: data of spectrum corresponding to mixture of isomers, (600 MHz, CDCl$_3$, 300 K) δ (ppm)=6.41-6.29 (m, 1H, —CH=), 5.27-5.24 (m, 1H, =CH$_2$), 5.07-5.05 (m, 1H, =CH$_2$), 5.04-4.99 (broad multiple, 3H, =CH$_2$), 4.63 (m, 1H, =CH$_2$), 4.57 (m, 1H, =CH$_2$), 2.25-2.05 (broad multiple, 4H, —CH$_2$—), 1.73-1.64 (m, 2H, —CH$_2$—), 1.70 (s, 3H, —CH$_3$), 1.64-1.59 (m, 2H, —CH$_2$—), 1.62-1.61 (m, 1H, —CH—), 1.62 (s, 3H, —CH$_3$), 1.53 (s, 3H, —CH$_3$), 1.50 (s, 2H, —Si—CH$_2$), 0.70-0.44 (m, 4H, Si—CH$_2$—CH$_2$—Si), 0.20 (m, 18H, —Si—(CH$_3$)$_6$), 0.18 (m, 6H, —Si—(CH$_3$)$_6$), 0.02-0.01 (m, 6H, —Si—(CH$_3$)$_2$).

$^{13}$C NMR: data of spectrum corresponding to mixture of isomers (150 MHz, CDCl$_3$, 300 K) δ (ppm)=146.76, 146.37, 146.35, 139.15, 133.50, 133.20, 122.19, 121.83, 115.89, 115.73, 115.71, 113.28, 113.13, 113.10, 108.97, 36.87, 31.91, 31.65, 28.11, 27.56, 27.35, 27.08, 26.42, 23.82, 21.65, 18.89, 12.76, 11.91, 11.81, 8.62, 7.98, 5.73, 3.24, 1.11, 2.86, 2.32.

Example 3: Initial Grignard Reaction of Chloromyrcene with Dichlorodimethylsilane, to Give a Chlorosilane Derivative of Myrcene, Followed by Reaction with Sodium Bissilylamide 1$^{ST}$ step:

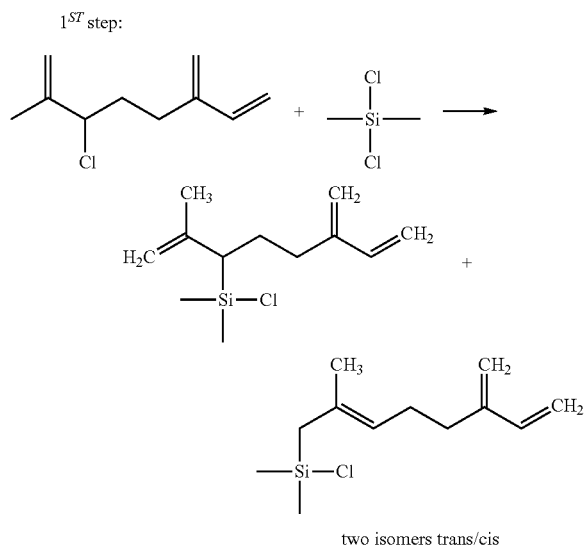

2$^{ND}$ step:

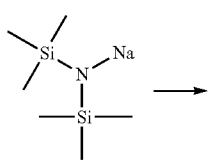

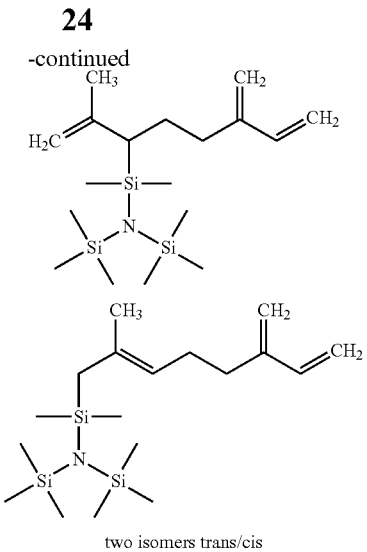

Experimental Procedure

A 500 ml three-necked round-bottom flask was equipped with a magnetic stir bar, an addition funnel, and a reflux condenser under N$_2$. Mg turnings (4 g, 0.16 mol) were added, followed by anhydrous THF (293 ml), then followed by DIBAH (0.5 ml, 2% mol of Mg). The activation of Mg was confirmed by the evolution of gas. Dichlorodimethylsilane (15 g, 0.16 mol) was added to the reaction mixture. After stirring for 5 min, chloromyrcene was added with constant rate over a 10-hour time period. Upon completion of the addition, the solution was stirred for another 1 h. The reaction mixture was slowly added to a round-bottom flask containing a 20% solution of bis(trimethylsilyl)amine in THF (or toluene). The resultant mixture was stirred for 2 h. After completion of the reaction, solvent was evaporated, and the obtained solid was filtered, yielding a yellow oil.

Application of Functionalized Myrcene in Anionic Polymerization

In order to provide more details about the synthesis and properties of elastomers produced according to the present invention, functionalized styrene-butadiene copolymers with exactly controlled micro- and macrostructure and with functional groups are described in Examples 4 and 5 below, and are compared with a non-functionalized copolymer as described in Comparative Example 3.

Polymerization

Inertization Step:

Hexane (1000 g) was added to a nitrogen-purged two liter reactor and treated with 1 gram of 1.6 M n-butyl lithium solution in hexane. The solution was heated to 70° C. and vigorously stirred for 10 minutes, to perform cleaning and inertization of the reactor. After that, solvent was removed via a drain valve, and nitrogen was purged again.

Example 3 (Anionic Polymerization, Comparative)

Hexane (750 g) was added to the inerted two liter reactor, followed by addition of styrene (30 g) and of 1,3-butadiene (113 g). Inhibitor from styrene and 1,3-butadiene was removed. Next, tetramethylethylenediamine (TMEDA, 2.04 mmol) was added, to provide random incorporation of styrene monomer and to increase the vinyl content of the butadiene units. The solution inside the reactor was heated to 60° C. and continuously stirred during the whole process.

When the desired temperature was reached, the impurities in the system were titrated by stepwise addition of n-butyl lithium (until the color of the reaction mixture changed to yellowish). Then, n-butyl lithium (0.817 mmol) was added, to initiate the polymerization process. The reaction was carried out as an isothermic process for 60 minutes. After this time, silicon tetrachloride ($6.13 \times 10^{-5}$ mol) was added to the polymer solution as a coupling agent. Coupling was performed for 5 minutes. The reaction solution was terminated using nitrogen-purged isopropyl alcohol (1 mmol) and was rapidly stabilized by the addition of 2-methyl-4,6-bis(octylsulfanylmethyl)phenol (at 0.3 phr polymer). The polymer solution was treated with isopropanol, and precipitation of polymer occurred. The final product was dried overnight in a vacuum oven.

Example 4 (Functionalized Myrcene of Example 2 as Comonomer)

Hexane (750 g) was added to the inerted two liter reactor, followed by addition of styrene (30 g), functionalized myrcene of Example 2 (1.63 mmol) (0.48 wt. %) and 1,3-butadiene (113 g). Inhibitor from styrene and 1,3-butadiene was removed. Next, tetramethylethylenediamine (TMEDA, 2.04 mmol) was added, to provide random incorporation of styrene monomer and to increase the vinyl content of the butadiene units. The solution inside the reactor was heated to 60° C. and continuously stirred during the whole process. When the desired temperature was reached, the impurities in the system were titrated by stepwise addition of n-butyl lithium (until the color of the reaction mixture changed to yellowish). Then, n-butyl lithium (0.817 mmol) was added, to initiate the polymerization process. The reaction was carried out as a isothermic process for 60 minutes. After this time, silicon tetrachloride ($6.13 \times 10^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanylmethyl)phenol (at 0.3 phr polymer). The polymer solution was treated with isopropanol, and precipitation of polymer occurred. The final product was dried overnight in a vacuum oven.

Example 5 (Functionalized Myrcene of Example 2 Both as Initiator Component and as Comonomer)

Hexane (750 g) was added to the inerted two liter reactor, followed by addition of styrene (30 g), functionalized myrcene of Example 2 (1.63 mmol) (0.48 wt. %) and 1,3-butadiene (113 g). Inhibitor from styrene and 1,3-butadiene was removed. Next, tetramethylethylenediamine (TMEDA, 2.04 mmol) was added as a styrene randomizer and to increase the vinyl content of the butadiene monomer-contributed units. The solution inside the reactor was heated to 60° C. and continuously stirred during the whole process. When the temperature was reached, the impurities in the system were titrated by stepwise addition of n-butyl lithium (until the color of the reaction mixture changed to yellowish).

n-BuLi (0.891 mmol) and functionalized myrcene of Example 2 (0.82 mmol) (0.24% wt.) were mixed together in a separate, gastight vessel, the contact time was about 5 min, and then the mixture was added to initiate the polymerization process. The reaction was carried out over 60 minutes, as an isothermic process. After this time, silicon tetrachloride ($6.13 \times 10^{-5}$ mol) was added to the polymer solution as a coupling agent. Coupling was performed for 5 minutes. The reaction solution was terminated using nitrogen-purged isopropyl alcohol (1 mmol) and rapidly stabilized by addition of 2-methyl-4,6-bis(octylsulfanylmethyl)phenol (at 0.3 phr polymer). The polymer solution was treated with isopropanol, and precipitation of polymer occurred. The final product was dried overnight in a vacuum oven.

Characterization

Vinyl Content (%)
   Determined by 600 MHz $^1$H-NMR, based on BS ISO 21561:2005

Bound Styrene Content (%)
   Determined by 600 MHz $^1$H-NMR, based on BS ISO 21561:2005

Functionalized Diene Content (%)
   Determined by 600 MHz $^1$H-NMR, based on modified BS ISO 21561:2005, internal method Molecular Weight Determination
   Gel permeation chromatography was performed via PSS Polymer Standards Service multiple columns (with guard column) using THF as the eluent and for sample preparation. Multi-angle laser light scattering measurements were carried out using a Wyatt Technologies Dawn Heleos II light scattering detector, DAD (PDA) Agilent 1260 Infinity UV-VIS detector and Agilent 1260 Infinity refractive index detector.

Glass Transition Temperature (° C.)
   Determined based on PN-EN ISO 11357-1:2009

Mooney Viscosity (ML (1+4)/100° C.)
   Determined based on ASTM D 1646-07, using an large rotor under the conditions of preheating=1 minute, rotor operating time=4 minutes, and temperature=100° C.

Vulcanization Characteristics
   Determined based on ASTM D6204, using RPA 2000 Alpha Technologies rubber processing analyzer, operating time=30 minutes, and temperature=170° C.

Evaluation of Properties of Green (Unvulcanized) Compounds

Using the rubbers obtained in Examples 4 and 5, and in Comparative Example 3, compounding was made according to the compounding recipe shown in Table 1. Rheological measurement of compounds was performed after addition of cure packages, before the vulcanization process. The following parameter was measured:

Payne Effect
   Determined based on ASTM D6204, using RPA 2000 Alpha Technologies rubber processing analyzer, strain sweep was carried out at a temperature of 100° C., frequency=20 CPM and amplitude range from 1% to 90%.

Evaluation and Measurement of Properties of Vulcanized Rubber Composition

A vulcanized rubber compound was produced using a polymer obtained in each of the examples, and was measured for the following test parameters Tire Predictors (Tan δ at 60° C., Tan δ at 0° C., Tan δ at −10° C.)
   A vulcanized rubber compound was used as a test sample and measured for this parameter, using a dynamic mechanical analyzer (DMA 450+ MetraviB) in single shear mode under the conditions of dynamic strain=2%, frequency=10 Hz, in the temperature range of from −50 to 65° C., with a heating rate of 2.5 K/min.

Table 3 shows the characterization results for the three samples synthesized for this study.

Compounding

Using the rubbers obtained in Examples 4, 5 and Comparative Example 3, respectively, compounding was made according to the "compounding recipe of rubber composition" shown in Table 1. The compounding of the solution styrene-butadiene rubber, fillers, and rubber additives was performed in a Banbury type of internal mixer (350E Brabender GmbH & Co. KG) and on a lab sized two roll mill. The rubber compounds were mixed in two different stages, and the final pass was completed on a two roll mill. The first stage was used to mix the polymer with oil, silica, silane coupling agent, 6PPD and activators in several steps. The second stage was used to further improve the distribution of the silica along with adding of carbon black, then the compound was allowed to sit for 24 hours. In order to be conditioned for the final pass, the rubber compound was allowed to condition for four hours. The final mixing was performed on a two roll mill. The last step was used to add the cure packages. After addition of cure packages rheological measurement and evaluation of Payne effect of green compound was performed. Then, each compound was vulcanized at 170° C., for $T_{95+1.5}$ minutes (based on RPA results), to obtain vulcanizates. Each vulcanized rubber compound was evaluated and measured for the above-mentioned curing characteristics and tire predictors. The results are shown in Table 2.

TABLE 1

Compounding recipe of rubber composition

| Component | phr |
|---|---|
| SBR | 75 |
| Polybutadiene rubber[1] | 25 |
| Silica[2] | 80 |
| Carbon Black[3] | 10 |
| Stearic acid | 2 |
| Zinc oxide | 3 |
| Oil extender[4] | 37.5 |
| 6PPD[5] | 2 |
| Bis[3-(triethoxysilyl)propyl]tetrasulfide[6] | 6.4 |
| N-tert-butyl-2-benzothiazole sulfenamide[7] | 1.7 |
| 1,3-Diphenylguanidine[8] | 2 |
| Sulphur | 1.5 |

[1]Synteca 44, a product of Synthos
[2]Zeosil 1165MP, a product of Solvay
[3]ISAF-N234, a product of Cabot corporation
[4]VivaTec 500, a product of Klaus Dahleke KG
[5]VULKANOX 4020/LG, a product of Lanxess
[6]Si 69, a product of Evonik
[7]LUVOMAXX TBBS, a product of Lehmann & Voss & Co. KG
[8]DENAX, a product of Draslovka a.s.

TABLE 2

| Example | Payne effect G'1-G'20 [kPa] | Payne effect G'1-G'90 [kPa] | tan δ (60° C.) | tan δ, (0° C.) | tan δ, (−10° C.) |
|---|---|---|---|---|---|
| 3 (comp.) | 221.5 | 333.31 | 0.1905 | 0.5482 | 0.7207 |
| 4 | 196.79 | 323.26 | 0.1661 | 0.5597 | 0.7266 |
| 5 | 169.23 | 301.63 | 0.1678 | 0.6237 | 0.7951 |

Unvulcanized rubber compositions 4 and 5 exhibit lower values of difference between the low strain and high strain dynamic elastic modulus, in comparison to control rubber 3. A decrease of the modulus of a filler reinforced rubber composition as its strain is increased is referred to as Payne effect. This decrease in modulus with increase in strain of the rubber composition is associated with the breakdown and agglomeration of reinforcing filler particles within the rubber composition. Lower values of Payne effect of compositions 4 and 5 indicate reduced filler-filler interaction and improvement in polymer-filler interaction.

Furthermore, the tire predictors of rubber compositions 4 and 5 according to the invention are improved relative to those of the control rubber composition 3 (in terms of rolling resistance, wet traction and ice traction).

Application of Functionalized Myrcene in Coordination Polymerization

In order to provide more details about the synthesis and properties of elastomers produced according to the present invention, functionalized butadiene homopolymer with functional groups are described in Examples 7 and 9 below, and are compared with a non-functionalized homopolymer as described in Comparative Examples 6 and 8. The amounts of starting materials as used in these examples are listed in Table 4. The measurement methods and evaluation methods of properties are shown below.

Polymerization (for Additional Information, See Also the Above Information Relating to Anionically Obtained Polymers)

For catalyst composition and procedure, see the following publications:

1. Lars Friebe, Oskar Nuyken and Werner Obrecht, "A Comparison of Neodymium Versatate, Neodymium Neopentanolate and Neodymium Bis(2-ethylhexyl)phosphate in Ternary Ziegler Type Catalyst Systems With Regard to their Impact on the Polymerization of 1,3-Butadiene", in Journal of Macromolecular Science, Part A: Pure and Applied Chemistry, (2005), 42, 7, 839-851;
2. Friebe, L., Nuyken, O., Windisch, H., and Obrecht, W. "Polymerization of 1,3-butadiene initiated by neodymium versatate/diisobutylaluminum hydride/ethylaluminum sesquichloride: Kinetics and conclusions about the reaction mechanism". in Macromol. Chem. Phys., (2002), 203, 8, 1055-1064.

General Polymerization Description:

A twenty liter reactor was filled with dry 1,3-butadiene and dry solvent (cyclohexane), and functionalized monomer of general formula (Ia), (Ib) (Ic) when functionalized, and heated to 60° C. Then, catalyst was added in the following sequence: neodymium bis(2-ethylhexyl)phosphate (NdP), diisobutylaluminum hydride (DIBAH) (both 0.1 M/L solutions in cyclohexane). Polymerization was started by addition of ethylaluminum sesquichloride (EASC) (1.0 M/L solution in cyclohexane). The solution inside the reactor was heated and continuously stirred during the whole process. The temperature of the reaction mixture was kept between 60 and 90° C. The reaction solution was terminated, using nitrogen-purged isopropyl alcohol, and was rapidly stabilized by the addition of 2-methyl-4,6-bis(octylsulfanylmethyl)phenol (at 1.0 phr polymer).

The polymer solution was subsequently transferred to a stripper. The reactor was flushed with portions of fresh cyclohexane and its contents were also transferred to the stripper. Distilled water, in an amount of double of the total mass of polymer solution, as well as pH regulator and soap were added to the polymer solution, and the stripper contents were then treated with steam. Steam-stripping was carried out until the entire amount of cyclohexane had been removed, and rubber crumbs were obtained. Then, the rubber crumbs were removed from the stripper, cooled to room temperature, milled and dried in a stream of hot air.

Details of the reaction conditions, of the used recipes and characteristics of the obtained polymers are included in Table 4 below.

TABLE 3

Obtained polymers characteristics (anionic polymerization)

| Example | $M_n$ [g/mol] | $M_w$ [g/mol] | $M_w/M_n$ | Vinyl content [%][1] | Styrene content [%] | Mooney | Tg [° C.] | Amount of functionalized myrcene [% wt][2] |
|---|---|---|---|---|---|---|---|---|
| 3 (comp.) | 218,300 | 334,100 | 1.53 | 62.27 | 20.49 | 63.3 | −24.1 | 0 |
| 4 | 224,400 | 356,700 | 1.59 | 61.85 | 20.91 | 61.8 | −24.7 | 0.24 |
| 5 | 233,300 | 396,900 | 1.70 | 62.00 | 22.20 | 66.3 | −22.9 | 0.48 |

[1]Based on 1,3-butadiene content.
[2]Actual content calculated from 1H NMR.

TABLE 4

Reactions conditions and obtained polymers characteristics (coordination polymerization), where $n_M/n_{Nd}$ - represents the molar ratio of monomer to neodymium, $n_{Cl}/n_{Nd}$ - represents the molar ratio of chloride to neodymium, $n_{DIBAH}/n_{Nd}$ - represents the molar ratio of DIBAH to neodymium, F % - represents content by weight percent of functionalized myrcene in the polymer chain

| | Reaction conditions | | | | | | GPC results | | | FTIR results [%] | | | DSC results Tg, ° C. | % F [% wt.][1] | MV [1 + 4] |
|---|---|---|---|---|---|---|---|---|---|---|---|---|---|---|---|
| Ex. | $T_{init}$ [° C.] | Cyclohexane [g] | 1,3-butadiene [g] | $n_M/n_{Nd}$ | $n_{Cl}/n_{Nd}$ | $n_{DIBAH}/n_{Nd}$ | Mn [kg/mol] | Mw [kg/mol] | Mw/Mn | Vinyl | 1,4-cis | 1,4-trans | | | |
| 6 | 60 | 12000 | 1500 | 9250 | 2 | 6 | 144.7 | 273.2 | 1.88 | 0.2 | 98.1 | 1.7 | −104.8 | 0 | 63.2 |
| 7 | 60 | 12000 | 1500 | 9250 | 2 | 7 | 138.5 | 251.4 | 1.82 | 0.2 | 97.8 | 2.0 | −105.3 | 0.8% | 58.1 |
| 8 | 60 | 12000 | 1500 | 9250 | 2 | 8 | 124.1 | 250.2 | 2.01 | 0.3 | 97.7 | 2.0 | −105.2 | 0 | 44.1 |
| 9 | 60 | 12000 | 1500 | 9250 | 2 | 8 | 125.0 | 253.9 | 2.03 | 0.3 | 97.6 | 2.1 | −104.9 | 0.8% | 50.4 |

[1]Theoretical value, some signals from catalyst overlap signals from functionalized diene Characterization (Additional Information, See Also the Above Information Relating to Anionically Obtained Polymers)

Vinyl Content, Cis-1,4 Content, Trans-1,4 Content (%)

The microstructure of butadiene rubber was determined by infrared spectroscopy (Thermo Scientific Nicolet Is10). The following peaks were used for quantitative determination of the poly(butadiene) microstructure: 735 cm$^{-1}$ (δ(cis-R—CH=CR—H), →cis-1,4, ε=0.192), 912 cm$^{-1}$ (δ(R—CH=CH—H), →vinyl (1,2), ε=1.0), 965 cm$^{-1}$ (δ(trans-R—CH=CR—H), →trans-1,4, ε=0.769).

The methodology is described in:
1. M. Kraft, Struktur and Absorptionsspektroskopie der Kunststoffe, VCH, Weinheim 1973, p. 93; and
2. E. O. Schmalz, W. Kimmer, Z. Anal. Chem. 1961, 181, 229.

Evaluation and Measurement of Properties of Vulcanized Rubber Composition (Additional Information, See Also the Above Information Relating to Anionically Obtained Polymers)

A vulcanized rubber compound was produced using a polymer obtained in each of the examples, and was measured for the following test parameters i) Tire predictors (tan δ at 60° C., tan δ at 0° C., tan δ at −10° C., J" at 30° C.)
   A vulcanized rubber composition was used as a test sample and measured for this parameter, using a dynamic mechanical analyzer (DMA 450+ MetraviB) in shear mode under the conditions of tensile strain=2%, frequency=10 Hz, in a temperature range of from −80 to 80° C., with a heating rate of 2.5 K/min.

ii) Rebound resilience
   Determined based on ISO 4662 iii) Reinforcement Factor
   Expressed as ratio between Modulus 300% and Modulus 100%, Determined based PN-ISO 37:2007 using Zwick/Roel 2005 iv) Silica dispersion
   Determined based ISO 1134 C, D, E; ASTM D7723, using disperGRADER Alpha Technologies Compounding (Additional Information, See Also the Above Information Relating to Anionically Obtained Polymers)

Using the rubbers as obtained in Examples 7 and 9 and Comparative Examples 6 and 8, respectively, compounding was made according to the compounding recipe as shown in Table 5. The compounding of the solution styrene-butadiene rubber, fillers, and rubber additives was performed in a Farrel type of internal mixer (Mixer Farrel BR+1600) and on a lab sized two roll mill. The rubber compounds were mixed in three different stages, first two on internal mixer, and third one (final pass) was completed on a two roll mill.

The first stage was used to mix the rubbers with oil, silica, silane coupling agent, 6PPD and activators in several steps. The second stage was performed to further improve the distribution of the silica along with adding of carbon black, then the compound was allowed to sit for 24 hours. In order to be conditioned for the final pass, the rubber compound was allowed to condition for four hours. The final mixing was performed on a two roll mill. The last step was used to add the cure packages. Then, each compound was vulcanized at 170° C., for $T_{95+1.5}$ minutes (based on RPA results), to obtain vulcanizates. Each vulcanized rubber compound was evaluated and measured for the above-mentioned curing characteristics, Payne effect and tire predictors. The results are shown in Table 6.

TABLE 5

| Component | phr | Mixing stage |
|---|---|---|
| SBR[1] | 52 | 1 |
| Polybutadiene rubber | 48 | 1 |
| Silica[2] | 80 | 1 |
| Carbon Black[3] | 5 | 2 |

TABLE 5-continued

| Component | phr | Mixing stage |
|---|---|---|
| Stearic acid | 2 | 1 |
| Zinc oxide | 2 | 1 |
| Oil extender[4] | 28 | 1 |
| 6PPD[5] | 2 | 1 |
| Antioxidant[6] | 2 | 1 |
| Wax[7] | 2 | 1 |
| Bis[3-(triethoxysilyl)propyl]tetrasulfide[8] | 6.4 | 1 |
| N-tert-butyl-2-benzothiazole sulfenamide[9] | 1.6 | 3 |
| 1,3-Diphenylguanidine[10] | 2 | 3 |
| Sulphur | 1.5 | 3 |

[1]Syntion 2150, a product of Synthos R&D, specification: non functionalized rubber, Mn ~202 kg/mol, Mw ~395 kg/mol, Mw/Mn = 1.95, styrene content 21.5%, vinyl 50.6% (/polymer), Tg ~−25° C.
[2]Zeosil 1165MP, a product of Solvay
[3]ISAF-N234, a product of Cabot Corporation
[4]VivaTec 500, a product of Klaus Dahleke KG
[5]VULKANOX 4020/LG, a product of Lanxess
[6]TMQ luvomaxx
[7]MC Wax 721
[8]Si 69, a product of Evonik
[9]LUVOMAXX TBBS, a product of Lehmann & Voss & Co. KG
[10]DENAX, a product of Draslovka a.s.

TABLE 6

| Ex. | % F [wt. %] | MV [1 + 4] | tan δ (60° C.)[1] | J" (30° C.)[2], [Pa$^{-1}$] | G' [Pa]/E' (−20'C.)[3] [MPa] | Rebound[4] at $T_{70°C}$ | RI (S300%/S100%)[5] | Silica Dispersion[6] [%] |
|---|---|---|---|---|---|---|---|---|
| 6 | 0 | 63 | 0.190 | 4.58E−08 | 1.64E+07 | 58 | 4.2 | 82 |
| 7 | 0.8% | 58 | 0.159 | 5.11E−08 | 1.22E+07 | 63 | 4.8 | 93 |
| 8 | 0 | 44 | 0.189 | 5.04E−08 | 1.59E+07 | 58 | 4.2 | 78 |
| 9 | 0.8% | 50 | 0.158 | 4.85E−08 | 1.24E+07 | 62 | 4.6 | 92 |

[1]Rolling resistance (lower is better)
[2]Dry traction (higher is better)
[3]Winter Traction (lower is better)
[4]Rebound at 70° C. (higher is better)
[5]Reinforcement index (higher is better)
[6]Silica dispersion (higher is better)

The rubbers as obtained in Examples 7 and 9 and Comparative Examples 6 and 8, respectively, were examined and compared to each other (functionalized vs. non-functionalized), see the results presented in Table 6.

Example 6 was compared with Example 7, and Example 8 with Example 9, since they correspond to similar Mooney ranges, namely higher (58, 63) and lower (44, 50).

In each case, tire predictors obtained from DMA, such as rolling resistance, dry traction, winter traction are improved when comparing functionalized (Ex. 7, 9—Table 6) and non-functionalized (Ex. 6, 8—Table 6) rubber, the same is true with respect to rebound at high temperature. The reinforcement index, the ratio of modulus 300% to modulus 100%, was also found to be increased, as well as much higher silica dispersion (dispeGRADER). This confirmed a much higher interaction between functionalized cis-polybutadiene rubber and filler (silica), as compared to the use of non-functionalized rubber.

While certain representative embodiments and details have been shown for the purpose of illustrating the subject invention, it will be apparent to those skilled in this art that various changes and modifications can be made therein without departing from the scope of the subject invention, which scope is defined by the following claims.

The invention claimed is:

1. A functionalized conjugated diene selected from the group of compounds of formula (Ia), (Ib), (Ic)

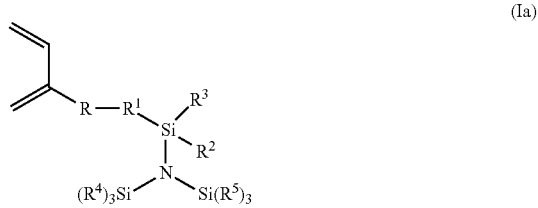
(Ia)

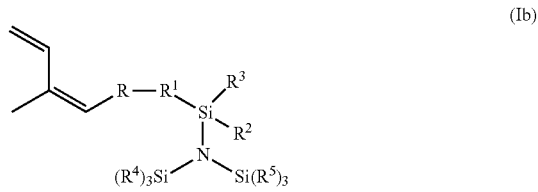
(Ib)

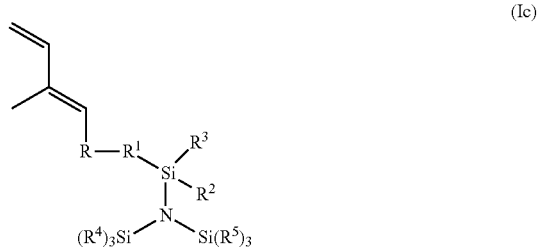
(Ic)

wherein
R is a linear or branched, saturated or unsaturated hydrocarbylene group, and R is optional,
R[1] is selected from
  i) a single bond,
  ii) one or more of an oxygen atom, a sulfur atom, a group NR[6], and a group SiR[7]R[8]; and
  iii) a hydrocarbylene group which may have one or more of an oxygen atom, a sulfur atom, a group NR[6], and a group SiR[7]R[8],
R[2], R[3], R[6], R[7], R[8] can be the same or different and represent an alkyl group containing from 1 to 10 carbon atoms, or an aryl or aralkyl group containing from 6 to 10 carbon atoms; and
R[4] and R[5] can be the same or different, and each R[4] and R[5] independently represents an alkyl group containing from 1 to 10 carbon atoms, or an aryl or aralkyl group containing from 6 to 10 carbon atoms.

2. The functionalized conjugated diene of claim 1, wherein $R^2$, $R^3$, $R^6$, $R^7$, and $R^8$ are the same or different and represent $CH_3$ or $C_6H_5$.

3. The functionalized conjugated diene of claim 1, wherein $R^1$ is selected from (i) a single bond, and (iii)
  a) $-(CH_2)_m-$, wherein m represents an integer from 1 to 12; or
  b) $-((CH_2)_m Y(CH_2)_n)_o-$, wherein m and n independently represent an integer from 0 to 12, o is an integer from 1 to 12, and Y is independently one or more of an oxygen atom, a sulfur atom, a group $NR^6$, and a group $SiR^7R^8$.

4. The functionalized conjugated diene of claim 3, wherein $R^1$ is (i) a single bond, or is (iii)b) $-(SiR^7R^8CH_2CH_2)-$.

5. The functionalized conjugated diene of claim 1, wherein $R^4$ and $R^5$ all represent $CH_3$.

6. The functionalized conjugated diene of claim 5, having formula

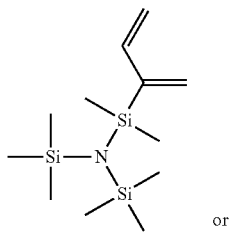

(XVa)

or

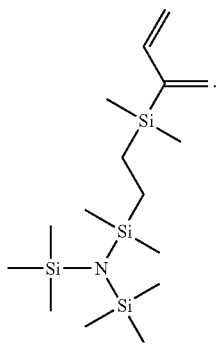

(XVb)

7. The functionalized conjugated diene of claim 1, wherein the residue in formula (Ia), (Ib), (Ic)

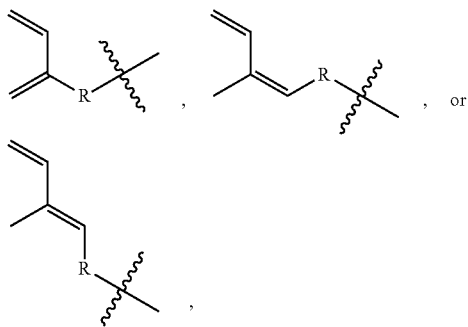

has at least 10 carbon atoms.

8. The functionalized conjugated diene of claim 7, wherein the residue in formula (Ia), (Ib), (Ic)

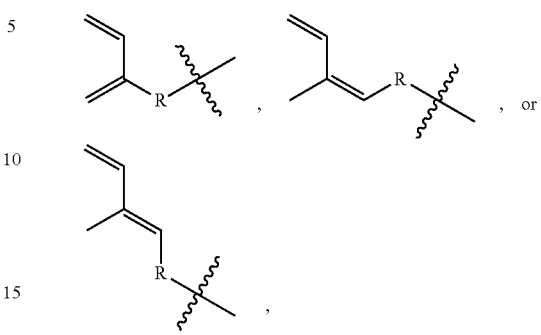

is selected from terpene and 4,8-dimethyl-1,3,7-nonatriene residues.

9. The functionalized conjugated diene of claim 8, wherein the terpene is selected from myrcene and ocimene.

10. The functionalized conjugated diene of claim 9, which is a myrcene derivative of formula (III), (IV), or (V)

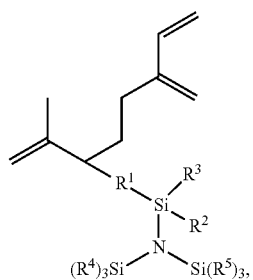

(III)

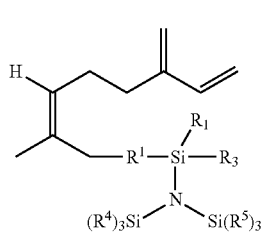

(IV)

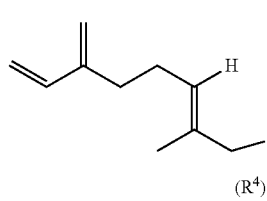

(V)

wherein
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and R⁴ and R⁵ can be the same or different, and each R⁴ and R⁵ independently represents an alkyl group containing from 1 to 10 carbon atoms, or an aryl or aralkyl group containing from 6 to 10 carbon atoms.

11. The functionalized conjugated diene of claim 10, wherein the myrcene derivative is of formula (IIa), (IVa), or (Va)

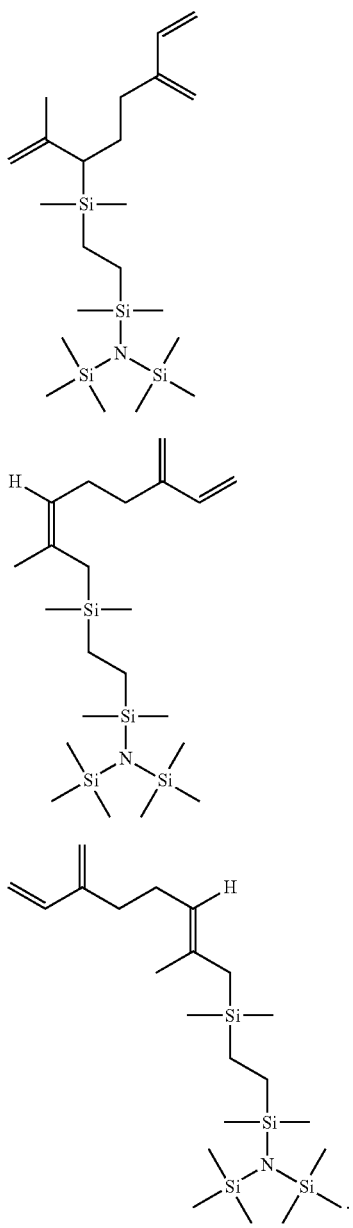

12. A method of producing an elastomeric copolymer, the method comprising copolymerizing one or more conjugated diene monomers, optionally one or more vinyl aromatic monomers, and optionally one or more functionalized conjugated dienes selected from the group of compounds of formula (Ia), (Ib), (Ic), by anionic copolymerization in the presence of an alkali metal salt derivative of a functionalized conjugated diene selected from the group of compounds of formula (Ia), (Ib), (Ic) as initiator for the anionic copolymerization, wherein formulae (Ia), (Ib), (Ic) are as follows:

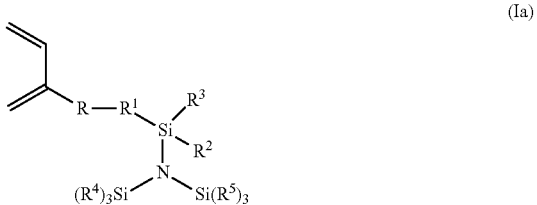

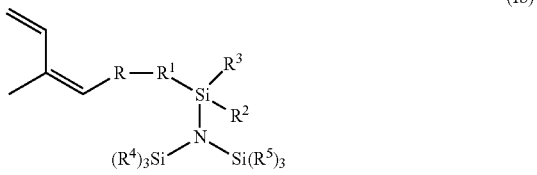

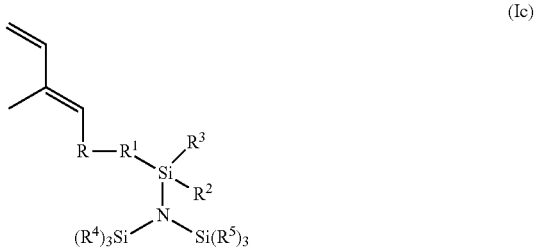

wherein
R is a linear or branched, saturated or unsaturated hydrocarbylene group, and R is optional,
R¹ is selected from
  i) a single bond,
  ii) one or more of an oxygen atom, a sulfur atom, a group NR⁶, and a group SiR⁷R⁸; and
  iii) a hydrocarbylene group which may have one or more of an oxygen atom, a sulfur atom, a group NR⁶, and a group SiR⁷R⁸,
R², R³, R⁶, R⁷, R⁸ can be the same or different and represent an alkyl group containing from 1 to 10 carbon atoms, or an aryl or aralkyl group containing from 6 to 10 carbon atoms; and
R⁴ and R⁵ can be the same or different, and each R⁴ and R⁵ independently represents an alkyl group containing from 1 to 10 carbon atoms, or an aryl or aralkyl group containing from 6 to 10 carbon atoms.

13. A process for the production of a copolymer component comprising coupled copolymer and terminally modified copolymer, the process comprising the following steps:
(1) providing an initiator component,
(2) contacting a monomer component comprising
  i) one or more functionalized conjugated dienes selected from the group of compounds of formula (Ia), (Ib), (Ic),
  ii) one or more conjugated diene monomers and
  iii) optionally one or more vinyl aromatic monomers,
  with the initiator component, to initiate anionic copolymerization;
(3) continuing copolymerization, to result in a copolymer;
(4) optionally continuing copolymerization of the copolymer, in the presence of one or more functionalized monomers, to result in a functionalized copolymer;
(5) coupling a part of the copolymer of step (3) or the functionalized copolymer of step (4) with one or more coupling agents, to result in coupled copolymer; and
(6) terminally modifying a part of the copolymer of step (3) or the functionalized copolymer of step (4) with one or more terminal modifying agents, to result in terminally modified copolymer, wherein formulae (Ia), (Ib), (Ic) are as follows:

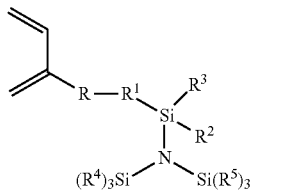
(Ia)

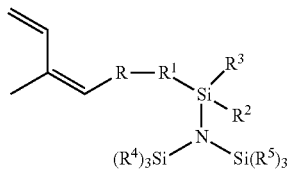
(Ib)

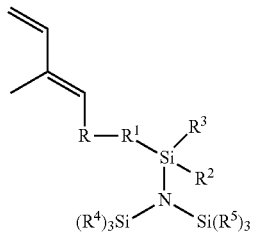
(Ic)

wherein

R is a linear or branched, saturated or unsaturated hydrocarbylene group, and R is optional, $R^1$ is selected from i) a single bond, ii) one or more of an oxygen atom, a sulfur atom, a group $NR^6$, and a group $SiR^7R^8$; and iii) a hydrocarbylene group which may have one or more of an oxygen atom, a sulfur atom, a group $NR^6$, and a group $SiR^7R^8$, $R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms.

14. The process of claim 13, wherein the initiator component comprises one or more alkali metal salt derivatives of one or more functionalized conjugated dienes selected from the group of compounds of formula (Ia), (Ib), (Ic)

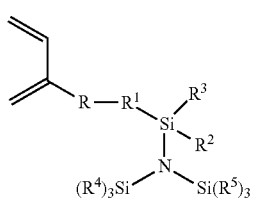
(Ia)

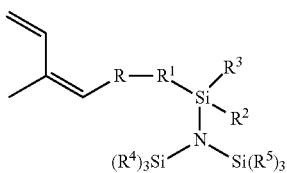
(Ib)

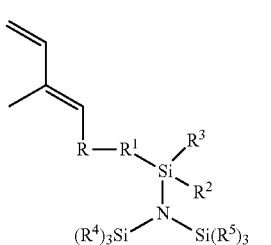
(Ic)

wherein

R is a linear or branched, saturated or unsaturated hydrocarbylene group, and R is optional, $R^1$ is selected from i) a single bond, ii) one or more of an oxygen atom, a sulfur atom, a group Me, and a group $SiR^7R^8$; and iii) a hydrocarbylene group which may have one or more of an oxygen atom, a sulfur atom, a group $NR^6$, and a group $SiR^7R^8$, $R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and $R^4$ and $R^5$ can be the same or different, and each $R^4$ and $R^5$ independently represents an alkyl group containing from 1 to 10 carbon atoms, or an aryl or aralkyl group containing from 6 to 10 carbon atoms, wherein the alkali metal is selected from lithium, sodium, and potassium.

15. A process for producing an elastomeric copolymer comprising subjecting i) one or more functionalized conjugated dienes selected from the group of compounds of formula (Ia), (Ib), (Ic)

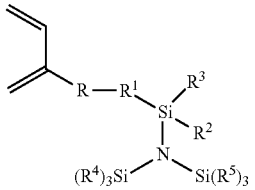
(Ia)

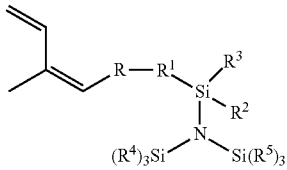
(Ib)

-continued

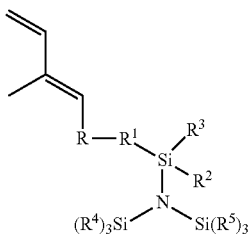
(Ic)

wherein
R is a linear or branched, saturated or unsaturated hydrocarbylene group, and R is optional,
R¹ is selected from
i) a single bond,
ii) one or more of an oxygen atom, a sulfur atom, a group NR⁶, and a group SiR⁷R⁸; and
iii) a hydrocarbylene group which may have one or more of an oxygen atom, a sulfur atom, a group NR⁶, and a group SiR⁷R⁸,
R², R³, R⁶, R⁷, R⁸ can be the same or different and represent an alkyl group containing from 1 to 10 carbon atoms, or an aryl or aralkyl group containing from 6 to 10 carbon atoms; and
R⁴ and R⁵ can be the same or different, and each R⁴ and R⁵ independently represents an alkyl group containing from 1 to 10 carbon atoms, or an aryl or aralkyl group containing from 6 to 10 carbon atoms,
ii) one or more conjugated diene monomers, and
iii) optionally one or more vinyl aromatic monomers
to anionic polymerization conditions.

16. The process of claim 15, wherein the anionic polymerization conditions include initiating the polymerization with an alkali metal salt derivative of the one or more functionalized conjugated dienes of formula (Ia), (Ib), (Ic), wherein the alkali metal is selected from lithium, sodium, and potassium.

17. A process for producing an elastomeric copolymer comprising subjecting
i) one or more functionalized conjugated dienes selected from the group of compounds of formula (Ia), (Ib), (Ic)

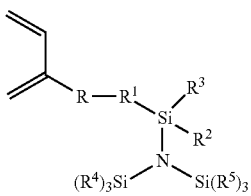
(Ia)

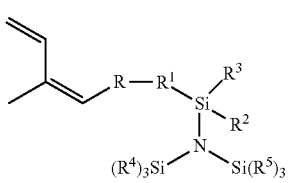
(Ib)

-continued

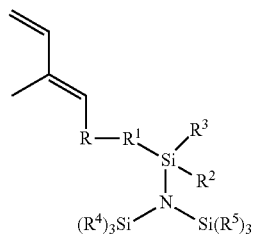
(Ic)

wherein
R is a linear or branched, saturated or unsaturated hydrocarbylene group, and R is optional,
R¹ is selected from
i) a single bond,
ii) one or more of an oxygen atom, a sulfur atom, a group NR⁶, and a group SiR⁷R⁸; and
iii) a hydrocarbylene group which may have one or more of an oxygen atom, a sulfur atom, a group NR⁶, and a group SiR⁷R⁸,
R², R³, R⁶, R⁷, R⁸ can be the same or different and represent an alkyl group containing from 1 to 10 carbon atoms, or an aryl or aralkyl group containing from 6 to 10 carbon atoms; and
R⁴ and R⁵ can be the same or different, and each R⁴ and R⁵ independently represents an alkyl group containing from 1 to 10 carbon atoms, or an aryl or aralkyl group containing from 6 to 10 carbon atoms,
and
ii) one or more conjugated diene monomers
to Ziegler-Natta polymerization conditions.

18. The process of claim 17, wherein the Ziegler-Natta polymerization conditions include a catalyst system comprising 1) metal chloride and 2) co-catalyst.

19. The process of claim 18, wherein the metal chloride 1) is selected from chlorides of one or more of Ni, Co, Ti, Nd, V, Ti, Zr, and Fe, and the co-catalyst 2) is selected from one or more of aluminium and magnesium alkyl compounds.

20. The process of claim 17, wherein the Ziegler-Natta polymerization conditions include a catalyst system comprising 1) non-halide metal compound, 2) co-catalyst, and 3) halide donor compound.

21. The process of claim 20, wherein the non-halide metal compound 1) is one or more Nd compounds.

22. A method of producing an elastomeric copolymer, the method comprising copolymerizing one or more functionalized conjugated dienes of claim 1 with one or more conjugated diene monomers.

23. The method of claim 22, wherein the amount of the one or more functionalized conjugated dienes of claim 1 is in a range of from 0.05 to 5 wt. %, based on the weight of the elastomeric copolymer.

24. The method of claim 22, wherein the conjugated diene monomer is selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

25. The method of claim 24, wherein the copolymerizing is by anionic polymerization or by coordination polymerization.

26. The method of claim 24, wherein the copolymerizing further comprises copolymerization of one or more vinyl aromatic monomers.

27. The method of claim 26, wherein the vinyl aromatic monomer is styrene.

28. An elastomeric copolymer comprising repeat units that are derived from
A) 0.05 wt. % to 5 wt. %, by weight of the copolymer, of one or more functionalized conjugated dienes selected from the group of compounds of formula (Ia), (Ib), (Ic)

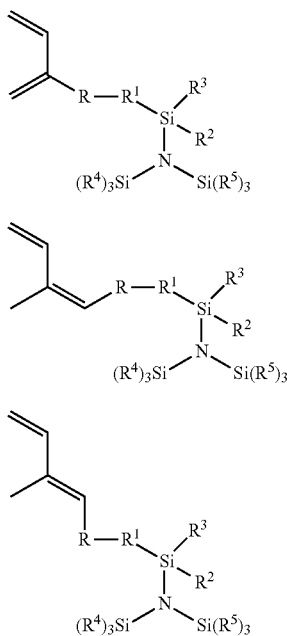

wherein
R is a linear or branched, saturated or unsaturated hydrocarbylene group, and R is optional,
$R^1$ is selected from
  i) a single bond,
  ii) one or more of an oxygen atom, a sulfur atom, a group $NR^6$, and a group $SiR^7R^8$; and
  iii) a hydrocarbylene group which may have one or more of an oxygen atom, a sulfur atom, a group $NR^6$, and a group $SiR^7R^8$,
$R^2$, $R^3$, $R^6$, $R^7$, $R^8$ can be the same or different and represent an alkyl group containing from 1 to 10 carbon atoms, or an aryl or aralkyl group containing from 6 to 10 carbon atoms; and
$R^4$ and $R^5$ can be the same or different, and each $R^4$ and $R^5$ independently represents an alkyl group containing from 1 to 10 carbon atoms, or an aryl or aralkyl group containing from 6 to 10 carbon atoms;
B) 45 wt. % to 99.95 wt. %, by weight of the copolymer, of one or more conjugated diene monomers;
C) 0 wt. % to 50 wt. %, by weight of the copolymer, of one or more vinyl aromatic monomers.

29. The elastomeric copolymer of claim 28 wherein the vinyl aromatic monomer is selected from styrene, 1-vinylnaphthalene, 3-methylstyrene, 3,5-diethyl styrene, 4-propylstyrene, 2,4,6-trimethylstyrene, 4-dodecylstyrene, 3-methyl-5-n-hexyl styrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, and α-methylstyrene.

30. The elastomeric copolymer of claim 28, wherein the conjugated diene monomer is selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

31. The elastomeric copolymer of claim 28, wherein the copolymer comprises units having a linear structure.

32. The elastomeric copolymer of claim 28, wherein the copolymer comprises units having a branched structure.

33. The elastomeric copolymer of claim 28, wherein the amount of B) conjugated diene monomer is 50 to 92 wt. %, by weight of the copolymer.

34. The elastomeric copolymer of claim 33, wherein the amount of B) conjugated diene monomer is 65 to 80 wt. %, by weight of the copolymer.

35. The elastomeric copolymer of claim 28 wherein the amount of C) vinyl aromatic monomer is 8 to 45 wt. %, by weight of the copolymer.

36. The elastomeric copolymer of claim 35, wherein the amount of C) vinyl aromatic monomer is 20 to 35 wt. %, by weight of the copolymer.

37. The elastomeric copolymer of claim 28, comprising less than 1 wt % C) vinyl aromatic monomer, wherein the amount of B) conjugated diene monomer is 95 to 99.95 wt. %, by weight of the copolymer.

38. The elastomeric copolymer of claim 37, comprising no C) vinyl aromatic monomer), wherein the amount of B) conjugated diene monomer is 99.0 to 99.4 wt. %, by weight of the copolymer.

39. The elastomeric copolymer of claim 28, wherein the copolymer comprises units having a star structure and being produced by the reaction of metal-terminated living linear copolymer with one or more coupling agents in anionic polymerization conditions.

40. The elastomeric copolymer of claim 39, wherein a.:
  I). the coupling agent is a tin halide coupling agent, or
  II). the coupling agent is a silicon halide coupling agent, and/or wherein b. the fraction of units having star structure is between 15 and 75%, by weight of the copolymer.

41. The elastomeric copolymer of claim 40, wherein in a. I), the tin halide coupling agent is tin tetrachloride.

42. The elastomeric copolymer of claim 40, wherein in a. II), the silicon halide coupling agent is selected from silicon tetrachloride, silicon tetrabromide, silicon tetrafluoride, silicon tetraiodide, hexachlorodisilane, hexabromodisilane, hexafluorodisilane, hexaiododisilane, octachlorotrisilane, octabromotrisilane, octafluorotrisilane, octaiodotrisilane, hexachlorodisiloxane, 2,2,4,4,6,6-hexachloro-2,4,6-trisilaheptane-1,2,3,4,5,6-hexakis [2-(methyldichlorosilyl)ethyl] benzene, and alkyl silicon halides of general formula (XVI)

$$R^6{}_n\text{---Si---}X_{4-n} \qquad (XVI),$$

wherein $R^6$ is a monovalent aliphatic hydrocarbon group having 1 to 20 carbon atoms or a monovalent aromatic hydrocarbon group having 6 to 18 carbon atoms; n is an integer of 0 to 2;
and X can be a chlorine, bromine, fluorine or iodine atom.

43. A method for producing a rubber comprising vulcanizing the elastomeric copolymer according to claim 28 in the presence of one or more vulcanizing agents.

44. A rubber as obtainable according to the method of claim 43.

45. A rubber composition comprising x) a rubber component comprising the rubber according to claim 44.

46. The rubber composition according to claim 45, wherein the amount of filler component y) is 10 to 150 parts by mass relative to 100 parts by mass of the rubber component x) (phr).

47. The rubber composition according to claim 46, wherein the amount of filler component y) is 30 to 130 phr.

48. The rubber composition according to claim 45, further comprising y) one or more fillers.

49. The rubber composition according to claim 48, wherein the filler is selected from the group consisting of silica, carbon black, and mixtures thereof.

50. The rubber composition according to claim 45 wherein the rubber component x) also comprises one or more further rubbery polymers.

51. A tire component comprising the rubber composition of claim 50.

52. The rubber composition according to claim 50, wherein the further rubbery polymer is selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

53. A tire comprising the tire component of claim 51.

54. The tire component of claim 51, which is a tire tread.

* * * * *

UNITED STATES PATENT AND TRADEMARK OFFICE
CERTIFICATE OF CORRECTION

PATENT NO. : 11,312,843 B2
APPLICATION NO. : 16/478198
DATED : April 26, 2022
INVENTOR(S) : Maria Siolek-Komorek It is certified that error appears in the above-identified patent and that said Letters Patent is hereby corrected as shown below:

In the Claims

• Column 38, Claim 14, Line 28, change "group Me" to --group $NR^6$--.

Signed and Sealed this
Third Day of January, 2023

Katherine Kelly Vidal
*Director of the United States Patent and Trademark Office*